US005847733A

United States Patent [19]
Bern

[11] Patent Number: 5,847,733

[45] Date of Patent: Dec. 8, 1998

[54] APPARATUS AND METHOD FOR INCREASING THE COVERAGE AREA OF A CONTROL ELECTRODE DURING DIRECT ELECTROSTATIC PRINTING

[75] Inventor: Bengt Bern, Mölndal, Sweden

[73] Assignee: Array Printers AB Publ., Västra Frölunda, Sweden

[21] Appl. No.: 621,074

[22] Filed: Mar. 22, 1996

[51] Int. Cl.$^{6}$ .......... G01D 15/16

[52] U.S. Cl. .......... 347/55

[58] Field of Search .......... 347/40, 12, 55, 347/54, 120, 124

[56] References Cited

U.S. PATENT DOCUMENTS

| | | | |
|---|---|---|---|
| 3,566,786 | 3/1971 | Kaufer et al. . | |
| 3,689,935 | 9/1972 | Pressman et al. . | |
| 3,779,166 | 12/1973 | Pressman et al. . | |
| 4,263,601 | 4/1981 | Nishimura et al. | 347/55 |
| 4,274,100 | 6/1981 | Pond . | |

(List continued on next page.)

FOREIGN PATENT DOCUMENTS

| | | | |
|---|---|---|---|
| 12 70 856 | 6/1968 | Germany . | |
| 26 53 048 | 5/1978 | Germany . | |
| 44-26333 | 11/1969 | Japan . | |
| 55-55878 | 4/1980 | Japan | 347/55 |
| 55-84671 | 6/1980 | Japan | 347/40 |
| 55-87563 | 7/1980 | Japan | 347/55 |
| 58-044457 | 3/1983 | Japan . | |
| 58-155967 | 9/1983 | Japan . | |
| 62-13356 | 1/1987 | Japan | 347/55 |
| 6329795 | 5/1990 | Japan . | |
| 04189554 | 8/1992 | Japan . | |
| 5-208518 | 8/1993 | Japan . | |
| 93331532 | 12/1993 | Japan . | |
| 94200563 | 8/1994 | Japan . | |
| 09118036 | 5/1996 | Japan . | |
| 9048151 | 2/1997 | Japan . | |
| 2108432 | 5/1983 | United Kingdom . | |
| 9014960 | 12/1990 | WIPO . | |
| 9201565 | 2/1992 | WIPO . | |

OTHER PUBLICATIONS

Bassous, E. et al., "The Fabrication of High Precision Nozzles by the Anisotropic Etching of (100) Silicon", *J. Electrochem. Soc.: Solid–State Science and Technology*, vol. 125, No. 8, Aug. 1978, pp. 1321–1327.

Johnson, Jerome, "An Etched Circuit Aperture Array for TonerJet® Printing", *IS&T's Tenth International Congress on Advances in Non–Impact Printing Technologies*, 1994, pp. 311–313.

Brochure of Toner Jet® by Array Printers, *The Best of Both Worlds*, 1990.

*Primary Examiner*—S. Lee
*Attorney, Agent, or Firm*—Knobbe, Martens, Olson & Bear, LLP

[57] ABSTRACT

A method for improving the print quality of an image recording apparatus in which charged particles are deposited in an image configuration on an information carrier is described. The method includes conveying the charged particles to a particle source adjacent to a back electrode; positioning a particle receiving information carrier between the back electrode and the particle source; providing a control array of control electrodes; providing at least one set of deflection electrodes; creating an electric potential difference between the back electrode and the particle source to apply an attractive force on the charged particles; connecting variable voltage sources to the control electrodes to produce a pattern of electrostatic fields to at least partially open or close passages in each electrostatic field by influencing the attractive force from the back electrode, thus permitting or restricting the transport of charged particles towards the information carrier; and connecting at least one deflection voltage source to at least one set of deflection electrodes to produce deflection forces modifying the symmetry of the electrostatic fields, thus controlling the trajectory of attracted charged particles.

23 Claims, 16 Drawing Sheets

U.S. PATENT DOCUMENTS 4,353,080 10/1982 Cross .
4,384,296 5/1983 Torpey .
4,386,358 5/1983 Fischbeck ................................ 347/55
4,470,056 9/1984 Galetto et al. .
4,478,510 10/1984 Fujii et al. .
4,491,794 1/1985 Daley et al. .
4,491,855 1/1985 Fujii et al. .
4,498,090 2/1985 Honda et al. .
4,511,907 4/1985 Fukuchi .
4,525,708 6/1985 Hareng et al. .
4,525,727 6/1985 Kohashi et al. ...................... 347/55 X
4,571,601 2/1986 Teshima .
4,675,703 6/1987 Fotland .
4,717,926 1/1988 Hotomi .
4,743,926 5/1988 Schmidlin et al. .
4,748,453 5/1988 Lin et al. .
4,814,796 3/1989 Schmidlin .
4,831,394 5/1989 Ochiai et al. .
4,837,071 6/1989 Tagoku et al. .
4,860,036 8/1989 Schmidlin .
4,912,489 3/1990 Schmidlin et al. .
4,922,242 5/1990 Parker .
5,028,812 7/1991 Bartky .
5,036,341 7/1991 Larrson .
5,038,159 8/1991 Schmidlin et al. .
5,057,855 10/1991 Damouth .
5,072,235 12/1991 Slowick et al. .
5,083,137 1/1992 Badyal et al. .
5,121,144 6/1992 Larson et al. ............................ 347/55
5,128,695 7/1992 Maeda ...................................... 347/55
5,148,595 9/1992 Doggett et al. .
5,170,185 12/1992 Takemura et al. .
5,181,050 1/1993 Bibl et al. .
5,204,696 4/1993 Schmidlin et al. .
5,204,697 4/1993 Schmidlin .
5,214,451 5/1993 Schmidlin et al. .
5,229,794 7/1993 Honma et al. ............................ 347/55
5,237,346 8/1993 Da Costa et al. .
5,256,246 10/1993 Kitamura .
5,257,045 10/1993 Bergen et al. .
5,270,729 12/1993 Stearns .
5,274,401 12/1993 Doggett et al. .
5,307,092 4/1994 Larson .
5,402,158 3/1995 Larson .
5,450,115 9/1995 Bergen et al. .
5,473,352 12/1995 Ishida .
5,477,246 12/1995 Hirabayashi et al. .
5,506,666 4/1996 Masuda et al. .
5,515,084 5/1996 Larson .
5,617,129 4/1997 Chizuk, Jr. et al. .
5,625,392 4/1997 Maeda .
5,640,185 6/1997 Kagayama .
5,650,809 7/1997 Kitamura ................................. 347/55
5,666,147 9/1997 Larson .

APPARATUS AND METHOD FOR INCREASING THE COVERAGE AREA OF A CONTROL ELECTRODE DURING DIRECT ELECTROSTATIC PRINTING

FIELD OF THE INVENTION

The present invention relates to image recording methods and devices and, more particularly, to a method for improving the print quality and reducing manufacturing costs of direct printing devices, in which a visible image pattern is formed by conveying charged toner particles from a toner carrier through a control array directly onto an information carrier.

The present invention also refers to a device for accomplishing said method.

BACKGROUND OF THE INVENTION

The most familiar and widely utilized electrostatic printing technique is that of xerography wherein latent electrostatic images formed on a charge retentive surface, such as a roller, are developed by suitable toner material to render the images visible, the images being subsequently transferred to an information carrier. This process is called an indirect process because it first forms a visible image on an intermediate surface and then transforms that image to an information carrier.

Another method of electrostatic printing is one that has come to be known as direct electrostatic printing. This method differs from the aforementioned xerographic method in that charged pigment particles (in the following called toner) are deposited directly onto an information carrier to form a visible image. In general, this method includes the use of electrostatic fields controlled by addressable electrodes for allowing passage of toner particles through selected apertures in a printhead structure. A separate electrostatic field is provided to attract the toner particles to an information carrier in image configuration.

The novel feature of direct electrostatic printing is its simplicity of simultaneous field imaging and particle transport to produce a visible image on the information carrier directly from computer generated signals, without the need for those signals to be intermediately converted to another form of energy such as light energy, as is required in electrophotographic printers, e.g., laser printers.

U.S. Pat. No. 5,036,341 discloses a direct printing method which begins with a stream of electronic signals defining the image information. A uniform electric field is created between a high potential on a back electrode and a low potential on a toner carrier. That uniform field is modified by potentials on selectable wires in a two-dimensional wire mesh array placed in the print zone. The wire mesh array consists of parallel control wires, each of which is connected to an individual voltage source, across the width of the information carrier. The multiple wire electrodes, called print electrodes, are aligned in adjacent pairs parallel to the motion of the information carrier; the orthogonal wires, called transverse electrodes are aligned perpendicular to the motion of the information carrier. All wires are initially at a white potential $V_w$ preventing all toner transport from the toner carrier. As image locations on the information carrier pass beneath wire intersections, adjacent transverse and print wire pairs are set to a black potential $V_b$ to produce an electrostatic field drawing the toner particles from the toner carrier. The toner particles are pulled through the apertures formed in the square region among four crossed wires (i.e., two adjacent rows and two adjacent columns), and deposited on the information carrier in the desired visible image pattern. The toner particle image is then made permanent by heat and pressure fusing the toner particles to the surface of the information carrier. A drawback in the method of U.S. Pat. No. 5,036,341 is that during operation of the control electrode matrix, the individual wires can be sensitive to the opening or closing of adjacent apertures, resulting in undesired printing due to the thin wire border between apertures. That defect is called cross coupling.

U.S. Pat. No. 5,121,144 discloses a control electrode array formed on an apertured insulating substrate with one ring shaped electrode surrounding each passage through the array. The ring electrodes are arranged in rows and columns on the insulating substrate. The transverse rows extend perpendicular to the motion of the information carrier and the columns are aligned at a slight angle to the motion of the information carrier in a configuration that allows printing to be achieved in sequence through each transverse row of apertures as the required dot positions arrive under the appropriate passage, thereby also allowing a larger number of dots to be deposited in a transversal direction on the information carrier. This results in a substantially enhanced printing performance, since every passage is not surrounded by any other electrode than the intended. However, since a single electronic control device is needed for each electrode, the ring electrode design requires a single electronic control device for each dot position, resulting in that the complexity and manufacturing costs of the method is substantially increased, due to the large number of electronic control devices required.

Another disadvantage of the aforementioned ring electrode array is that the ring electrodes may be influenced by their interaction with an adjacent connector leading to a ring electrode located in another row. A large number of ring electrodes are located on a narrow space, at a relatively small distance to each other, and each of those ring electrodes is connected to a connector part extending on the insulating substrate, joining the ring electrode and the corresponding control device. Those closely spaced connector parts may interact with other ring electrodes than the intended. Particularly, as a connector part borders on a ring electrode which is set to a black potential to attract toner particles, the trajectory of those attracted toner particles is influenced by whether the bordering connector part leads to an opened passage or to a closed passage. Namely, if two ring electrodes are simultaneously set to black potentials and the connector part leading to one of those ring electrodes is adjacent the other ring electrode, the thereby attracted toner particles tend to be slightly deflected from their initial trajectory in the direction of the connector part, forming displaced dots on the information carrier. This defect is known as the dot deflection phenomenon.

Regardless of the design or the material of the control array, it is also essential in all direct printing methods, to minimize the gap distance between the toner carrier and the control electrodes and to avoid any variation of that distance. Since the control electrodes apply attracting electrostatic forces on the toner particles, those forces being proportional to the distance between the electrodes and the toner carrier, any variation of that distance modifies the amount of attracted toner particles and thereby also the dot size of the print, resulting in a degradation of the print quality. Many attempts to improve means for maintaining a constant minimal gap between the control electrode array and the charged toner layer, while simultaneously insuring no contact therebetween, have been disclosed in the prior art. According thereto, spacing means of different materials are commonly used to space the control array from the toner carrier. Excess particles are scraped from the toner carrier to reduce the layer thickness. Common to those solutions is that the spacing means might be mounted perfectly parallel to the surface of the toner carrier. Thus, any imperfection along the edge of the spacing means would degrade the print quality.

Thus, to improve the print quality and lower manufacturing costs of direct electrographical printing device, there is a need for a method to reduce the number of control electrodes and related electronic control devices, reduce cross coupling and undesired dot deflection, while maintaining or preferably enhancing the print resolution and allowing a constant minimal distance between the control array and the toner carrier.

SUMMARY OF THE INVENTION

The present invention refers to a method for improving the printing quality of a direct printing apparatus, in which toner particles are deposited onto an information carrier to form a visible image pattern. A voltage source is connected to a back electrode to attract charged toner particles from a toner carrier. The information is conveyed between the toner carrier and the back electrode. A control array, positioned between the toner carrier and the information carrier, is provided with control electrodes and deflection electrodes. Variable voltage sources are connected to the control electrodes to selectively generate a pattern of electrostatic fields to at least partially open and close passages through the array, thus permitting or restricting toner transport from the toner carrier. Deflection voltage sources are sequentially connected to deflection electrodes to modify the symmetry of the electrostatic fields, thus controlling the toner trajectory towards the information carrier.

THE OBJECT OF THE INVENTION AND MOST IMPORTANT FEATURES

The present invention satisfies a need for a lower cost, higher quality direct printing method and directing printing apparatus. According to the preferred embodiment of the invention, a direct printing method is performed by advantageously utilizing the aforementioned dot deflection phenomenon to increase the transverse addressability of the print, thereby also reducing the number of control electrodes required. Common to all direct printing methods is that the toner particles are intended to follow a substantially straight trajectory from the opened passages onto the information carrier. However, the number of dots per length unit can be addressed transversely, i.e., perpendicular to the motion of the information carrier, can be increased by conveying the attracted toner particle along different paths from each opened passage towards the information carrier. The preferred embodiment of the present invention is a direct printing method in which printing is achieved in at least two sequences. During one of those sequences, toner particles are conveyed through the opened passages along a straight trajectory towards the information carrier and are deposited thereon to form a central dot beneath the corresponding aperture. During other sequences, the symmetry of the attracting field applied on the toner particles is slightly altered, causing those toner particles to be slightly altered, causing those toner particles to be deflected from their initial, straight trajectory and thus be deposited at a small distance beside the central dot. Particularly, according to a preferred embodiment of the present invention, three print sequences are performed to address one additional dot on each side of the central dot. In that particular case, the trajectory deflection is controlled to distribute the obtained three dots in a transversal alignment. The distance between the deflected dots and the central dot, in the following called deflection length, is controlled to obtain separate, touching or overlapping dots. The method ensures complete coverage of the information carrier by providing at least one addressable dot position at every point across a line in a direction transverse to the movement of the information carrier. One important aspect of the invention involves the deflection control in each control electrode to increase the dot addressability of each aperture and reduce the number of control electrodes required. Preferably, the dot deflection is controlled to provide transversely aligned dots, although toner particles can be deflected in any other direction.

The method is not limited to transversal dot deflection. However, the dot addressability in other directions, and, particularly, the dot addressability along a line parallel to the motion of the information carrier, is commonly increased by lowering the velocity of the motion of the information carrier. The number of dots addressed through each aperture and the deflection length is variable, the foregoing example given only as a preferred embodiment.

A device for accomplishing the method includes at least one toner carrier, such as a developer sleeve or conveyor belt, which transports toner from a toner container into the print zone, a back electrode connected to a back voltage source, an information carrier such as a sheet of plain, untreated paper caused to move between the toner carrier and the back electrode, and at least one control array of control electrodes, preferably located between the toner carrier and the information carrier.

The control array is preferably formed on an insulating substrate having at least one layer and a plurality of preferably circular apertures arranged therethrough, with at least one control electrode surrounding each aperture and at least one additional electrode, in the following called deflection electrode, arranged adjacent or spaced around each aperture. A potential field is set up by the back electrode creating an attractive force for the toner particles through the apertures. Activating a control electrode surrounding a particular aperture alters the potential field set up by the back electrode to permit or restrict the passage of toner material through the aperture and thus form the image configuration onto the information carrier. A control electrode surrounding an aperture is preferably ring shaped but may take any other shape having symmetry about a central axis of the aperture, to provide a uniform distribution of toner particles therethrough. Accordingly, the potential field produced by a control electrode is essentially symmetric about a central axis of the corresponding aperture so that the attracted toner particles are conveyed along a straight trajectory and thus deposited beneath the center of the aperture, forming a central dot. Simultaneously activating a control electrode surrounding a particular aperture and a deflection electrode adjacent the aperture modifies the symmetry of the attracting field acting on the toner particles and thus deflects the trajectory of those toner particles from the central axis of the aperture, resulting in that the obtained dot location is shifted with respect to the central axis of the aperture.

A control array of the preferred embodiment of the invention includes a plurality of preferably circular apertures aligned in at least one transverse row perpendicular to the motion of the information carrier. Each aperture is surrounded by a ring shaped control electrode which is connected to a control voltage source, and preferably a pair of deflection electrodes disposed adjacent to the control electrode. Each deflection electrode has a preferably arcuate shape and extends along a portion of the circumference of the corresponding control electrode.

In one embodiment of the invention, the deflection electrodes placed adjacent a particular aperture are arranged in a pair of diametrically opposed arcuate segments about the central axis of the aperture, so that each segment is used to deflect the toner trajectory in opposed direction from the central axis of the aperture. One deflection segment is positioned on each side of a transverse axis of the aperture forming a pair of diametrically opposed deflection segments. A line joining the center points of both segments through the center point of the aperture intersects the transverse axis of the aperture at a deflection angle αd. As the apertures are aligned in transverse rows, the transverse axis of each aperture coincides with the axis of the corresponding row, so that each pair of deflection segments comprises one segment on each side of a row axis. All deflection segments disposed on the same side of a row axis are connected to each other, each series of each row being connected to similarly disposed series of adjacent rows. Accordingly, the control array includes two separate sets of deflection segments, each segment of the first set being disposed on one side of a transverse axis of the corresponding aperture and each segment of the second set being disposed on the other side thereof.

Thus, three transversely aligned dots are addressed through each aperture of the control array. The first set of deflection segments is activated to deflect toner particles obliquely against the motion of the information carrier. The second set of deflection segments is activated to deflect toner particles in a diametrically opposed direction about the central axis of the aperture, i.e., obliquely with the motion of the information carrier. As a first passage is opened through a particular aperture to permit toner transport towards the information carrier, a first deflection segment modifies the symmetry of the electrostatic field produced by the control electrode surrounding the aperture, so that the toner particles attracted through the opened passages are deflected from their initial trajectory obliquely against the motion of the information carrier to form a first deflected dot. Due to the motion of the information carrier, that first deflected dot is longitudinally transferred. As the first deflected dot arrives on a level with the central axis of the aperture, a second passage is opened through the aperture while preventing all deflection of the attracted toner particles to form a central, undeflected dot beside the first deflected dot. Subsequently, as a third passage is opened through the aperture, the second set of deflection segments is activated to deflect the attracted toner particles obliquely with the motion of the information carrier to form a second deflected dot on the other side of the central, undeflected dot. An appropriate value of the deflection angle αd is chosen to compensate the motion of the information carrier, to obtain transversely aligned dots. Each set of deflection segments is connected to at least one deflection control device, supplying a deflection voltage to the deflection segment. An appropriate value of each deflection voltage is chosen to provide the desired deflection length. The present invention is not limited to any particular design of the control array. The number, location, connection and shape of the deflection segments around each aperture are variable parameters, the foregoing example given only as a preferred embodiment of the invention.

Another important feature of the present invention is the considerable reduction of the number of apertures and associated control electrode needed. The method ensures total coverage of the information carrier due to the increased addressability of the apertures, thus allowing a larger space between two adjacent apertures. A larger space between two adjacent apertures not only eliminates cross coupling therebetween but also allows spacing means to be arranged parallel to the motion of the information carrier between the control array and the toner carrier. In one embodiment, at least one spacing means is disposed between two apertures of a transverse row, in direct contact with both the array and the toner carrier to maintain a minimal constant distance therebetween.

Another feature of the invention is that, as one set of deflection segments are activated, the remaining sets of deflection segments are utilized to electrically shield the corresponding control electrode from undesired interaction with the electrostatic field produced by adjacent control electrodes or any other adjacent component than the activated segment, thereby effectively eliminating undesired dot deflection and cross coupling.

In an alternate embodiment of the invention, the control array is formed on an insulating substrate having at least two layers. The control electrodes are preferably arranged on a top layer facing the toner carrier and the deflection electrodes are disposed on an under layer or between two layers.

DETAILED DESCRIPTION OF THE PREFERRED EMBODIMENT

Figure 1:
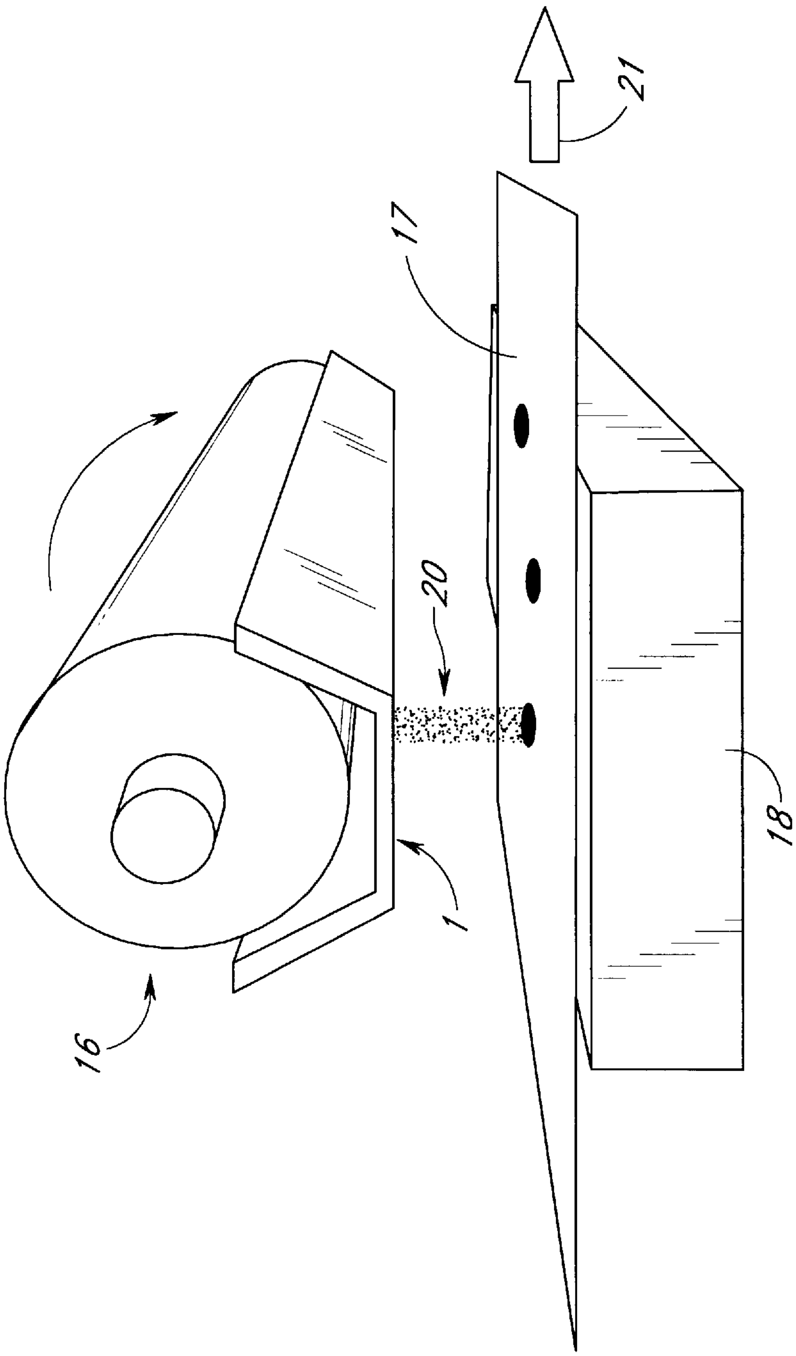
FIG. 1 is a simplified perspective view of a direct printing apparatus.

FIG. 1 illustrates an apparatus for performing a direct printing method. The print zone includes a toner carrier 16, a back electrode 18 and an information carrier 17 transferred therebetween in the direction of arrow 21. Toner particles 20 are transported from the toner carrier 16 to the information carrier 17 through a substrate 1.

Figure 2:
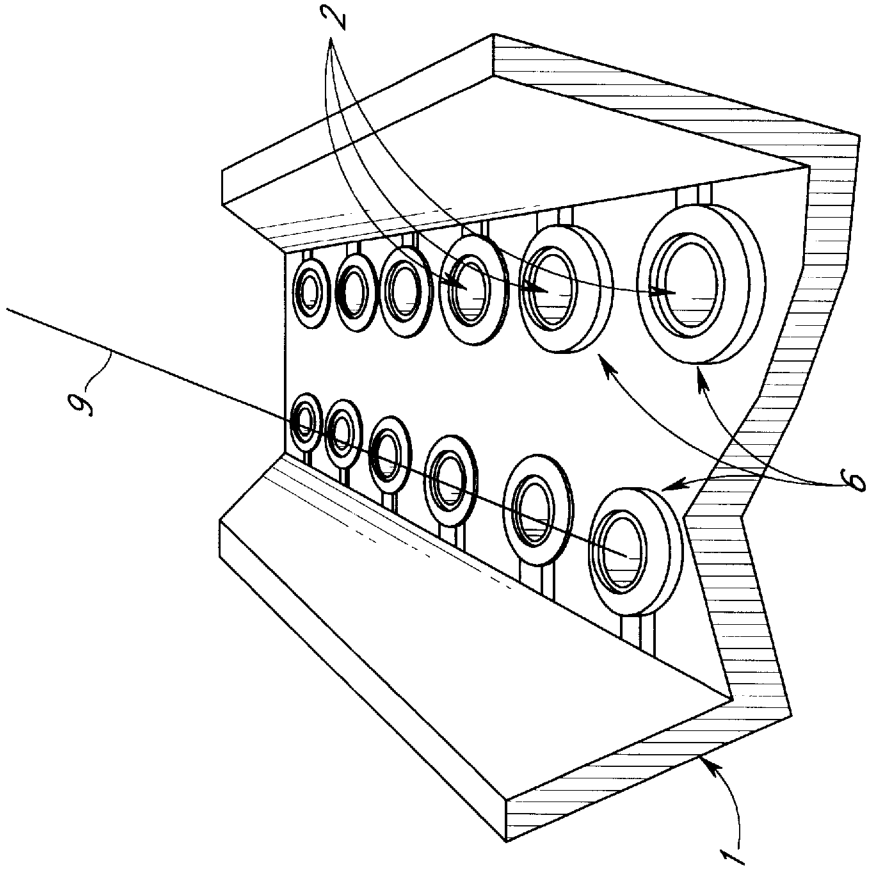
FIG. 2 (Prior Art)
FIG. 2 is a simplified perspective view of a control device according to prior art.

FIG. 2 shows a control array of control electrodes 6 surrounding apertures 2, according to prior art. The apertures are aligned in parallel transverse rows 9.

Figure 3:
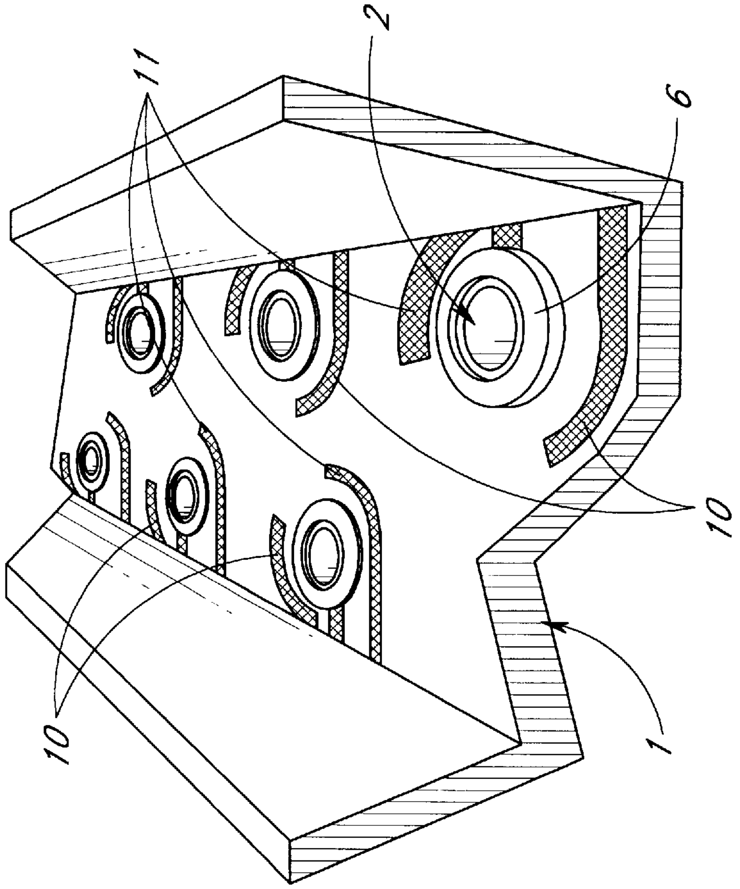
FIG. 3 is a simplified perspective view of a control device according to the present invention.

FIG. 3 shows a control array according to the present invention. Each aperture 2 is associated with a control electrode 6, a first deflection electrode segment 10 and a second deflection electrode segment 11.

Figure 4:
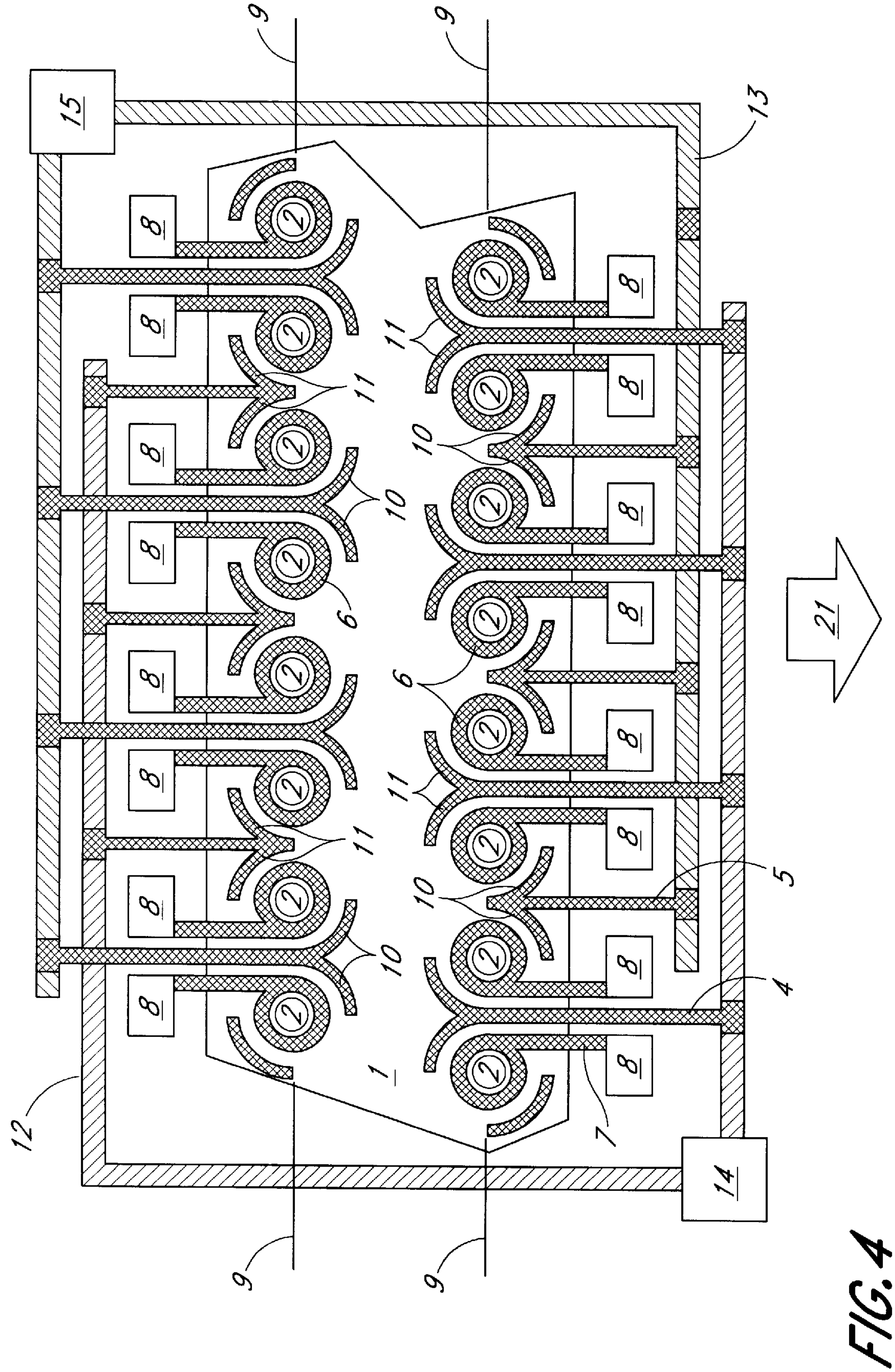
FIG. 4 is a schematic plan view of a part of the control array according to a first embodiment of the present invention.

According to a preferred embodiment of the present invention, the control array shown in FIG. 4 is preferably formed on an insulating substrate 1 having at least one transverse row 9 of circular apertures 2 arranged through the substrate 1. An information carrier (not shown), such as, for example, a sheet of plain, untreated paper, is fed under the control array in the direction of arrow 21. The row 9 of apertures 2 extend perpendicular to the motion of the information carrier. Each aperture 2 is surrounded by a ring shaped control electrode 6 and at least two preferably arcuate deflection segments 10, 11. Each ring shaped control electrode 6 is individually connected to a variable voltage source 8 through a connection means 7 etched on the substrate 1, extending substantially parallel to the motion of the information carrier. In the embodiment shown in FIG. 4, the arcuate deflection segments 10, 11 are spaced around different portions of the circumference of each ring shaped control electrode 6.

Figure 5:
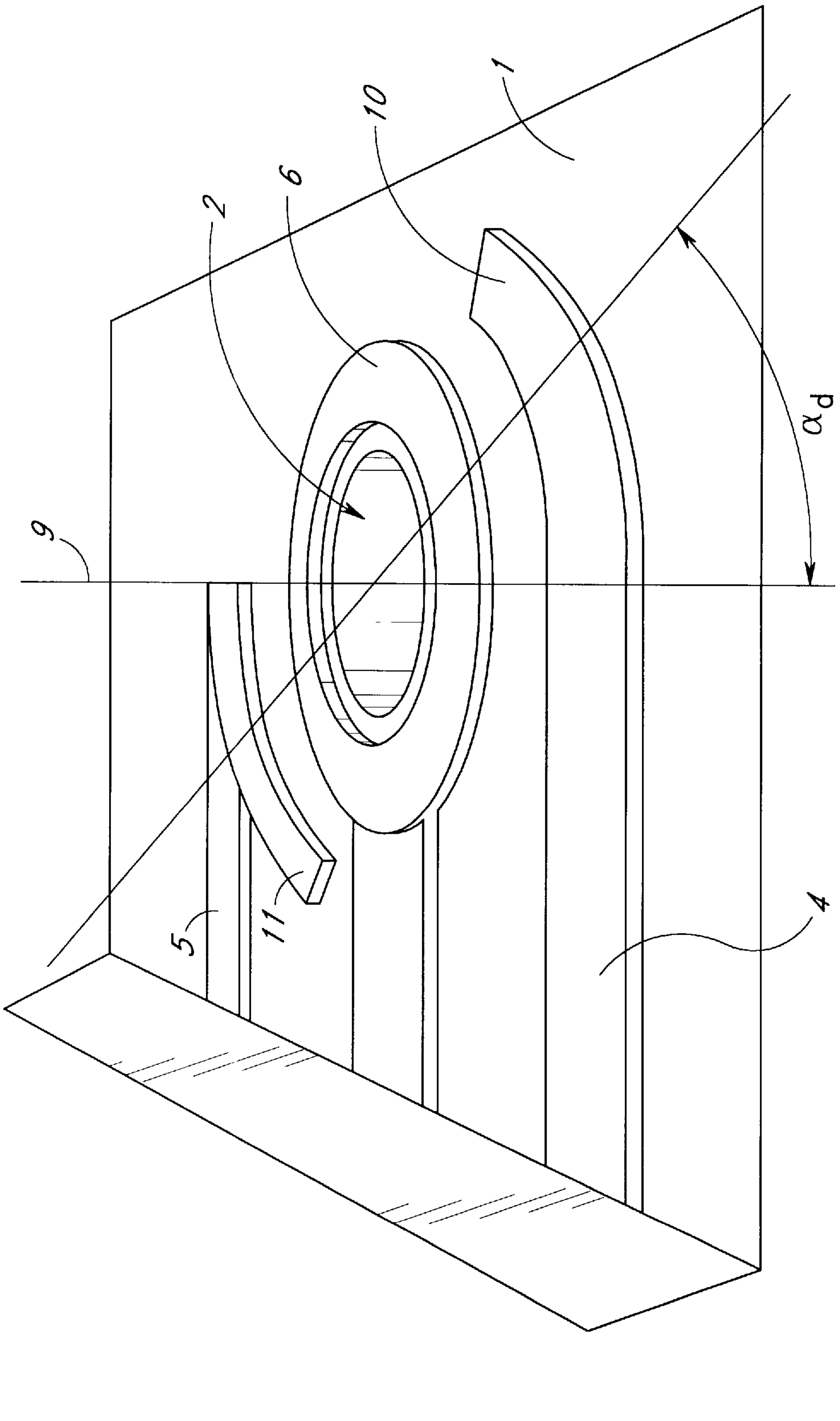
FIG. 5 is an enlargement of a single aperture of the array shown in FIG. 4.

As shown in FIG. 5, an aperture 2 of the control array of FIG. 4 is related to one ring shaped control electrode 6 circumscribing the aperture 2, a first deflection segment 10 positioned adjacent to the control electrode 6 and extending around a first portion of the circumference of the control electrode 6, and a second deflection segment 11 positioned adjacent to the control electrode 6 and extending around a second portion of the circumference of the control electrode 6. Both deflection segments 10, 11 are disposed symmetrically about a center axis of the aperture 2. The first segment 10 is connected to a deflection voltage source 14 (FIG. 4) through a connector means 4. The second segment 11 is connected to a deflection voltage source 15 (FIG. 3) through a connector means 5. A virtual line joining the center points of the deflection electrodes 10, 11 through the center point of the aperture 2, intersects the transverse axis 9 of the aperture 2 at an angle αd, in the following called deflection angle. The deflection segments are essentially located on different sides of the transverse axis 9 of the aperture 2.

As shown in FIG. 4, a deflection segment located on one side of the transverse axis 9 of the aperture 2 is in connection with each adjacent deflection segment located on the same side of the transverse axis 9 of the aperture row. Thus, each aperture 2 is associated with two deflection segments each of which is in connection with deflection segments similarly located about the transverse axis of the aperture row 9.

In the embodiment shown in FIG. 4, two separate sets of deflection electrodes are formed by connecting all first deflection segments 10 in a first series and connecting all second deflection segments 11 in a second series. Any number of deflection segments adjacent each control electrode is conceivable within the scope of the invention, the example shown in FIG. 4 given only to clarify the fundamental idea of the invention. Still referring to FIG. 4, all deflection segments 10 of the first set are connected through connection means 4 to a first main connector 12 and all the deflection segments 11 of the second set are connected through connection means 5 to a second main connector 13. In the embodiment shown in FIG. 4, two adjacent pairs of deflection segments 10, 11 are longitudinally reversed to reduce the number of connection means 4, 5.

Those skilled in the art of etched circuit design will recognize that numerous design variations will accomplished the desired result.

Figure 6A:
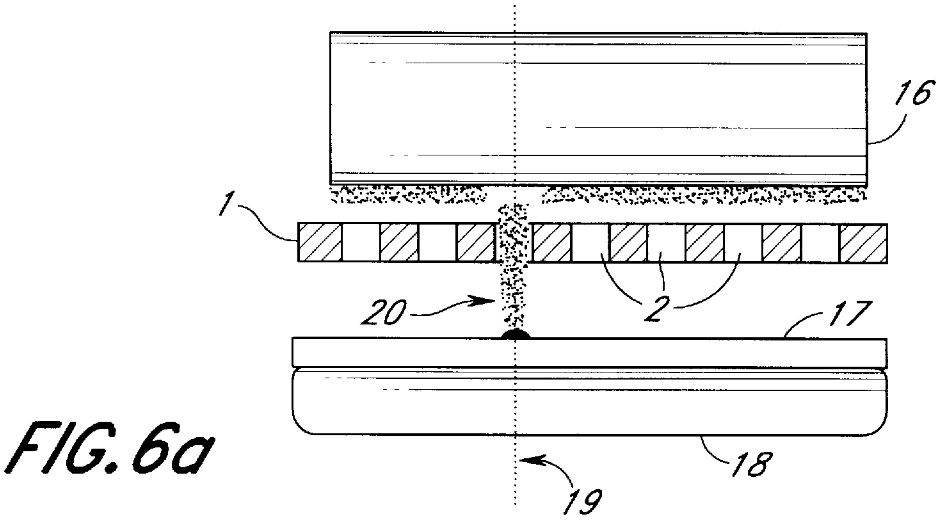
FIG. 6*a* is a simplified front view of the print zone, with undeflected toner trajectory.
Figure 6B:
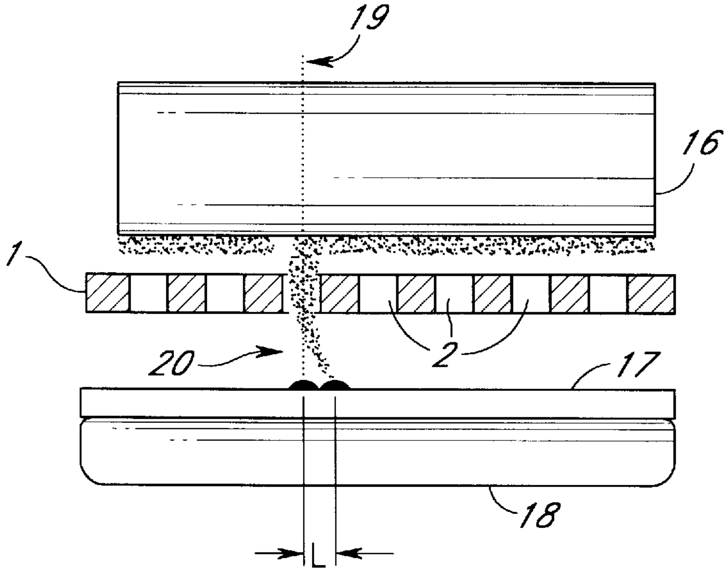
FIG. 6*b* is a simplified front view of the print zone, with deflected toner trajectory.
Figure 7A:
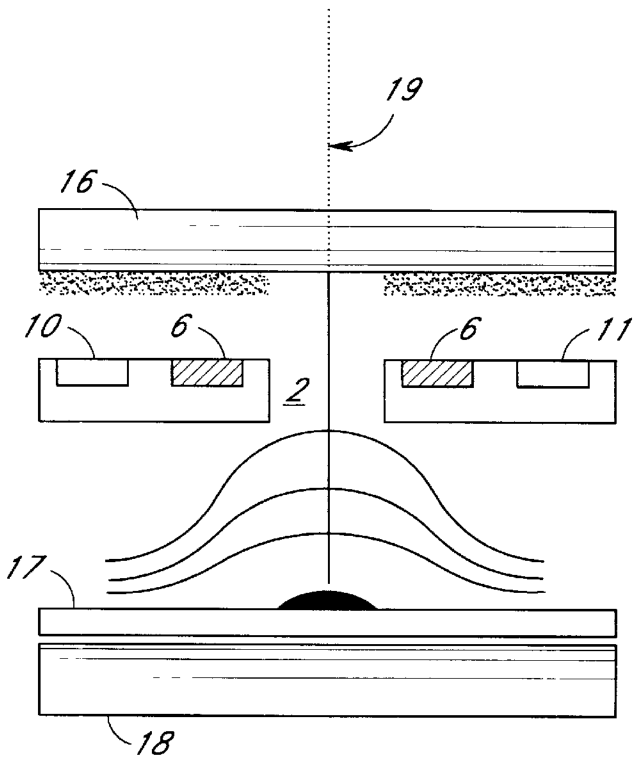
FIG. 7*a* is a section view through an aperture of FIG. 6*a*.
Figure 7B:
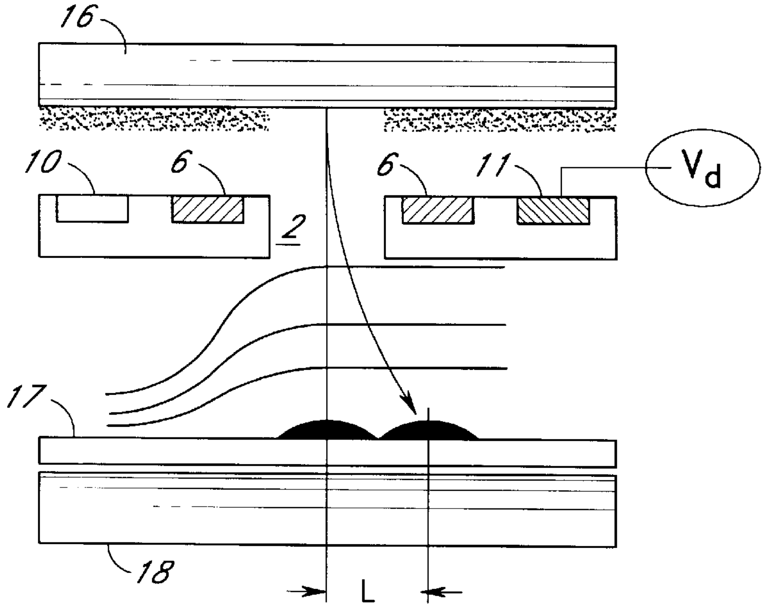
FIG. 7*b* is a section view through an aperture of FIG. 6*b*.

FIGS. 6*a* and 6*b* are schematic section views of the print zone through a row 9 of aperture 2. FIGS. 7*a* and 7*b* are enlargements of FIGS. 6*a* respective 6*b* through a single aperture 2. The print zone comprises a back electrode 18; a toner carrier 16 such as a developer sleeve, conveying a thin layer of charged toner particles to a position adjacent to a back electrode 18; a background voltage source (not shown) connected to the back electrode 18 to attract charged toner particles 20 from the toner carrier 16; an information carrier 17, such as a plain paper surface or any media suitable for direct electrostatic printing, transferred between the back electrode 18 and the toner carrier 16; a control array formed on a substrate 1, including control electrodes 6 and at least two sets of deflection segments 10, 11, positioned between the toner carrier 16 and the information carrier 17; control voltage signals (not shown) connected to the control electrodes 6 of the control array to generate a pattern of electrostatic fields which permit or restrict toner transport from the toner carrier 16; and at least one deflection control device (not shown) connected to at least one of the sets of deflection segments 10, 11 to alter the symmetry of the electrostatic fields, thus influencing the toner trajectory towards the information carrier 17. FIG. 6*a* illustrates a print sequence wherein toner particles 20 are transported from the toner carrier 16 towards the information carrier 17 along a substantially straight trajectory coinciding with the central axis 19 of an aperture 2 arranged through the array. As shown in FIG. 7*a*, a ring shaped control electrode 6, disposed symmetrically about the central axis 19 of the aperture 2, circumscribes the aperture 2. Control voltage signals (not shown) are connected to the control electrode 6 to "open" a passage through the aperture 2, thus permitting toner transport from the toner carrier 16. Since the electrostatic field generated by the control electrode 6 is substantially symmetric about the central axis 19 of the aperture 2, the toner 20 is transported along a straight path to form a dot centered beneath the aperture 2. The equipotential lines of FIG. 7 illustrate a schematic configuration of the electrostatic field. As shown in FIG. 7*a*, the deflection segments 10, 11 are inactive. However, although the potential difference between the deflection segments 10, 11 is insufficient to influence the toner trajectory, the deflection segments can be given a shielding potential to prevent an undesired interaction between the electrostatic fields of two adjacent control electrodes.

FIG. 6*b* illustrates a print sequence wherein toner particles 20 are transported from the toner carrier 16 towards the information carrier 17 along a deflected trajectory, due to the influence of a deflection voltage applied on one set of deflection segments 11. As shown in FIG. 7*b*, the deflection segment 11 is activated to modify the symmetry of the electrostatic field generated by the control electrode 6. Thus, the potential difference between both deflection segments 10, 11 is sufficiently high to influence the field symmetry about the central axis 19 of the aperture.

This can be achieved by supplying the segment electrode 11 with an attractive deflection force acting only on a portion of the symmetric control electrode 6 to reinforce the field through that portion. However, the same result can obviously be achieved by supplying the opposed deflection segment with a corresponding deflection force repelling the toner 20. Hereinafter, the term "activate" might be understood as to create a sufficient potential difference between two opposed segments. In effect, as long as every deflection segment 10, 11 is given the same potential, the field symmetry remains unaltered.

As shown in FIG. 7*b*, the equipotential lines give a schematic illustration of the field distribution about the central axis 19 of the aperture 2. The deflection forces applied on the toner 20 deflect the toner trajectory to address a deflected dot on the information carrier 17. That deflection forces applied on the toner 20 deflect the toner trajectory to address a deflected dot on the information carrier 17. That deflected dot is deposited at a transverse distance L from the central axis 19 of the aperture 2. When the deflection force is chosen to correspond to a deflection length L of one dot Length, the two dots obtained during the two subsequent print sequences of FIG. 7*a* and 7*b* forms a pair of transversely aligned touching dots on the information carrier 17.

Figure 8A:
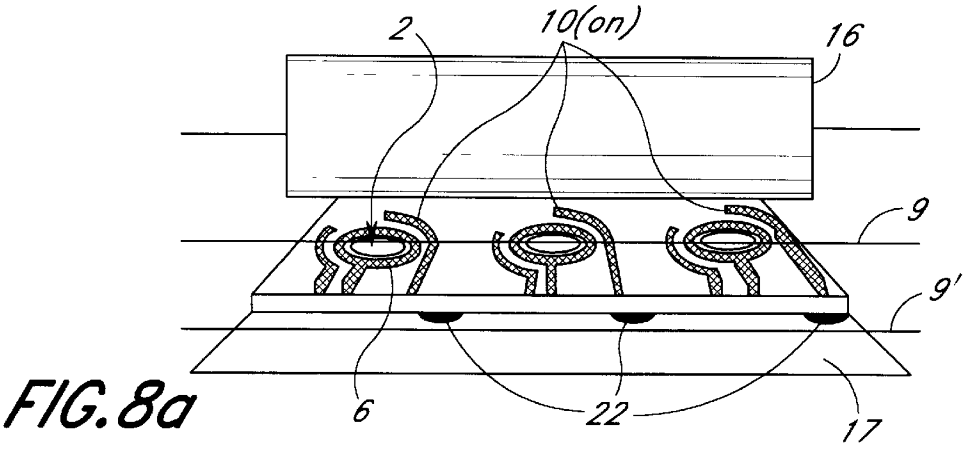
FIGS. 8*a*, 8*b*, and 8*c* are schematic perspective views of a portion of a print zone during three subsequent steps of a method according to one embodiment of the present invention.
Figure 8B:
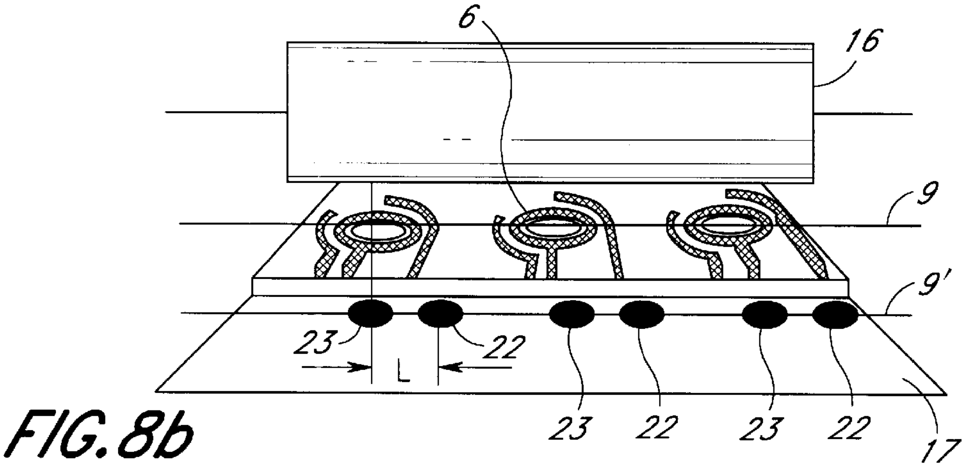
Figure 8C:
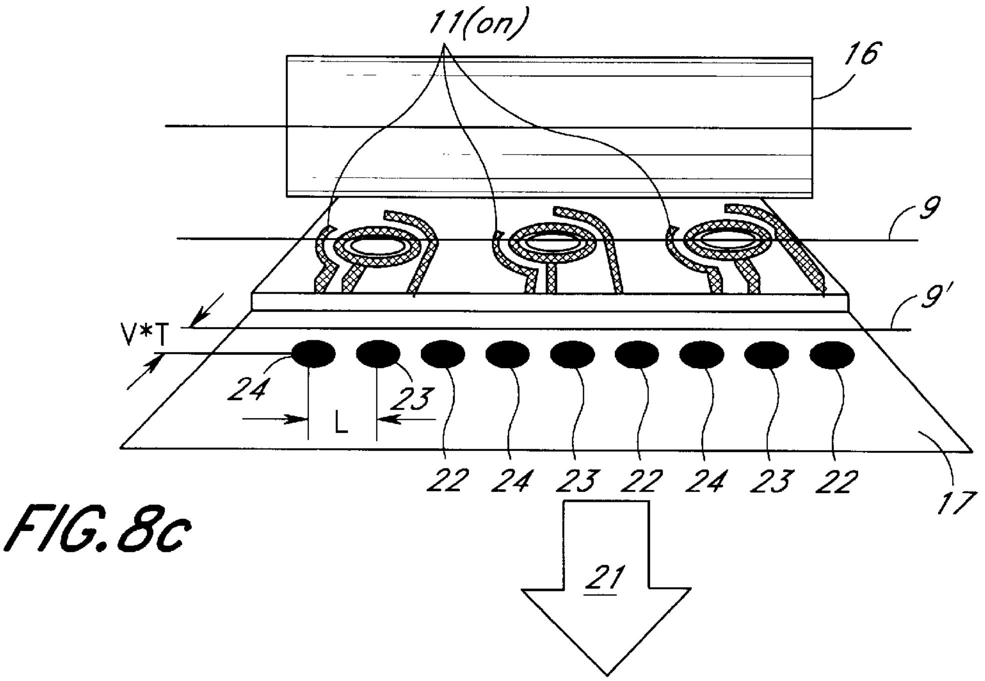
Figure 9A:
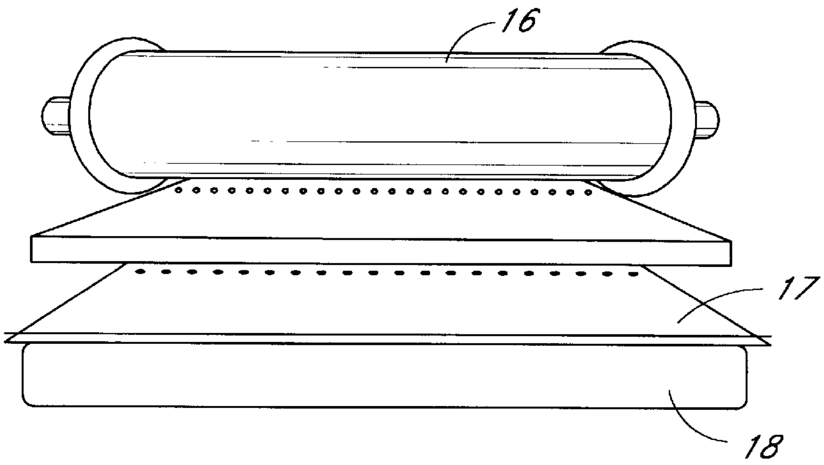
FIGS. 9*a*, 9*b*, and 9*c* are schematic perspective views of a portion of a print zone during three subsequent steps of a method according to another embodiment of the present invention.
Figure 9B:
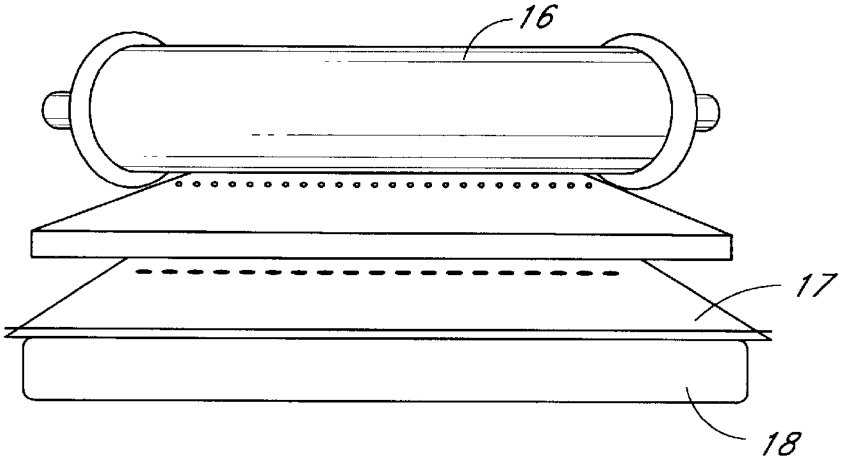
Figure 9C:
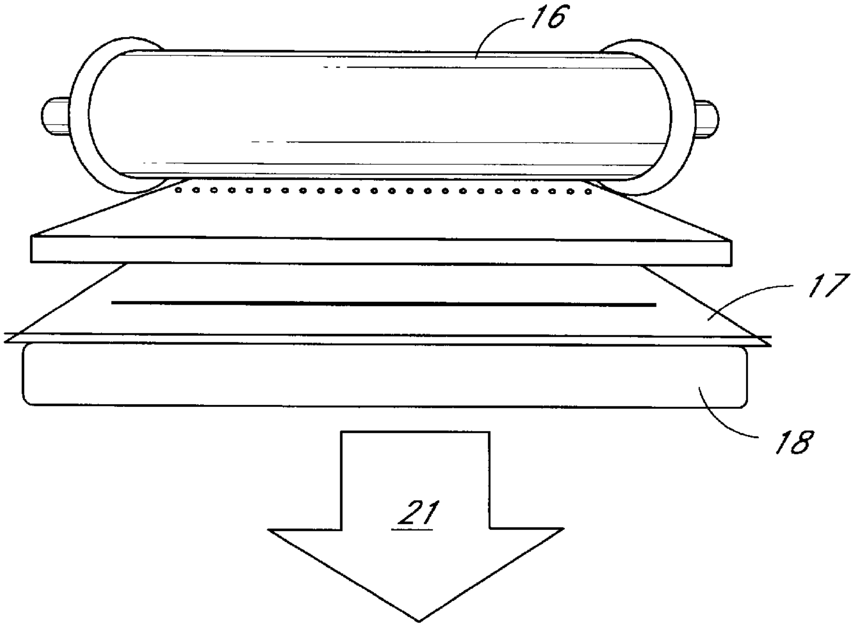

FIGS. 8*a*, 8*b* and 8*c* are schematic perspective views of a portion of the print zone during three subsequent print sequences of a method, according to one embodiment of the invention. FIGS. 9*a*, 9*b*, and 9*c* are schematic perspective views of the whole print zone during the three subsequent print sequences of FIGS. 8*a*, 8*b* and 8*c*, when the method is achieved to print a continuous transverse line across the information carrier 17.

Figure 10:
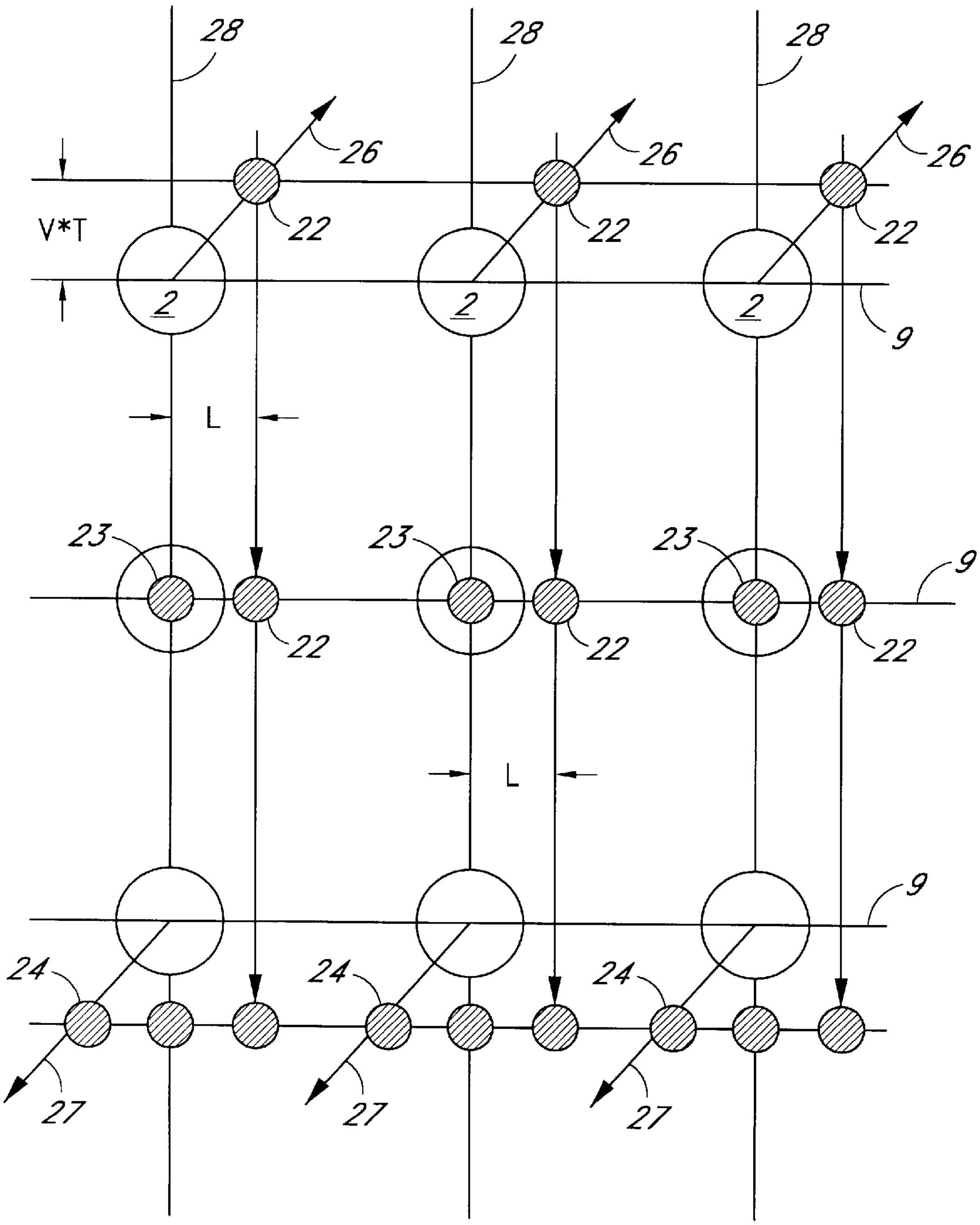
FIG. 10 illustrates the geometric configuration of dot position obtained during the three subsequent steps of FIGS. 9*a*, 9*b* and 9*c*.

FIG. 10 illustrates the position of obtained dots during the three sequences of FIGS. 8*a*, 8*b*, and 8*c*.

Referring to FIGS. 9*a*, 9*b*, 9*c*, the print zone comprises a toner carrier 16, an information carrier 17 caused to move in the direction of the arrow 21, and a back electrode 18 positioned under the information carrier 17.

During the first print sequence shown in FIG. 8*a*, a deflection voltage source (not shown) is connected to the first set of deflection segments 10 to deflect toner particles obliquely against the motion of the information carrier 17.

The obtained dot position is shown in FIG. 10. The deflection force acts on the toner particles in the direction of arrows 26. The first deflected dots 22 are deposited in a transverse row at a distance V*T from an orthogonal projection 9' of the row axis 9, where V is the velocity of the information carrier 17 and T the time of one print sequence. Referring to FIG. 10, the first deflected dots 22 are deposited at a deflection length L from the longitudinal axis 28 of each aperture 2.

The first deflected dots 22 are transferred with the motion (arrow 21) of the information carrier 17 towards the projection 9' of the row axis 9.

As the first deflected dots 22 reach the projection 9' of the row axis 9, a second print sequence, shown in FIG. 8*b*, is performed. The deflection segments 10, 11 are given the same potential, resulting in that the toner trajectory remains undeflected. Dots 23 are centered beneath the center of each aperture 2, as shown in FIG. 10.

As the first deflected dots 22 and the central dots 23 are transferred a distance V*T from the projection 9' of the row axis 9, a third print sequence is performed, as shown in FIG. 8*c*.

A deflection voltage source (not shown) is connected to the second set of deflection segments 11 to deflect toner particles obliquely with the motion of the information carrier 17.

The obtained dot position is shown in FIG. 10. The deflection force acts on the toner particles in the direction of arrows 27, i.e., opposed to the direction of arrows 26. The second deflected dots 24 are deposited on the opposed side of the central dots 23.

The deflection directions 26, 27 intersect the transverse axis of the row 9 of apertures 2 at a deflection angle αd. The value of the deflection angle αd is chosen to compensate the motion of the information carrier 17 during three subsequent print periods, to obtain three transversely aligned dots 22, 23, 24. The value of the deflection angle αd can be determined by: tan αd=V*T/L, so that the optimal value of a deflection angle according to the foregoing embodiment is αd=arctan (⅓), i.e., about 18.4°.

Figure 11A:
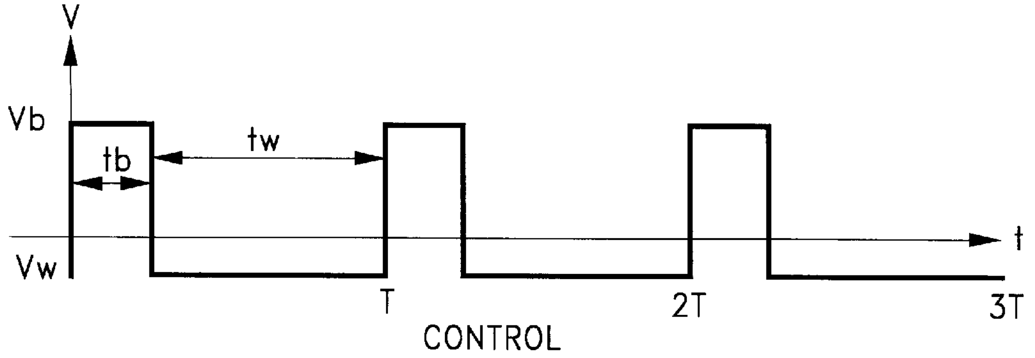
FIGS. 11*a*, 11*b*, and 11*c* illustrate a control and deflection pulse according to an embodiment of the present invention.
Figure 11B:
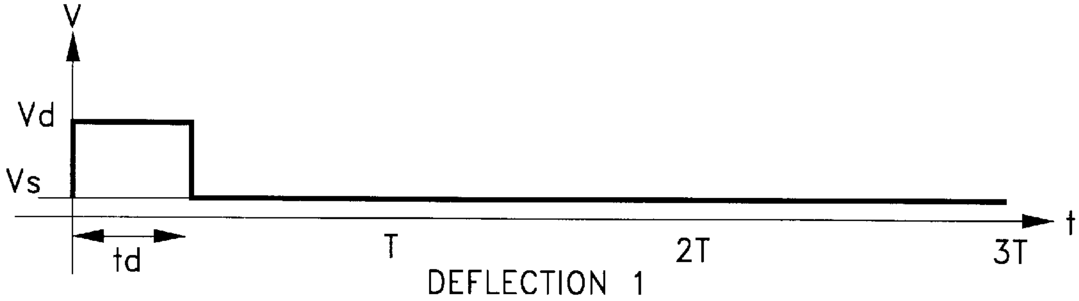
Figure 11C:
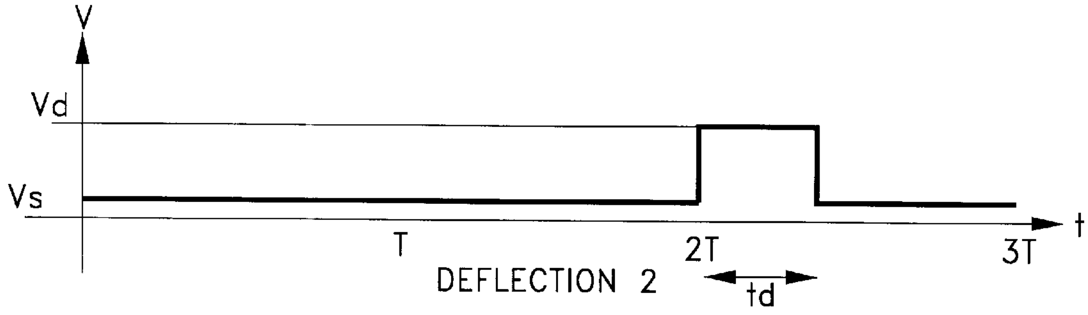

FIGS. 11*a*, 11*b*, and 11*c* illustrates the control pulse from different voltage sources during the three subsequent print sequences of FIGS. 8*a*, 8*b*, and 8*c*.

In a nonprint condition, each voltage source supplies voltage $V_w$ to its associated control electrode to prevent toner transport through the apertures 2. In the print condition, a control voltage source supplies a different voltage $V_b$ is applied during a time period $t_b$ to allow the intended amount of toner particles to be transported from the toner carrier onto the information carrier.

Afterwards, the voltage source restores the voltage $V_w$ during a new time period $t_w$ to allow new toner particles to be conveyed on the surface of the toner carrier to a position adjacent to the print zone. Thus, the total time period of each print sequence is $T=t_b+t_w$. During a first print sequence, a first deflection voltage source supplies a deflection voltage $V_d$ to the first set of deflection electrode segments 10, during a time period $t_d$, where $0<t_d<T$. During the first print sequence, a second deflection voltage source supplies a screen voltage $V_s$ to the second set of deflection electrode segments 11, shielding electrostatically all apertures against interaction with the control electrodes of adjacent apertures.

During a second print sequence, all deflection electrode segments 10, 11 are given a screen voltage $V_s$ to establish a symmetric field configuration through each aperture 2.

During a third print sequence, the second deflection voltage source supplies a deflection voltage $V_d$ to the second set of deflection electrode segments 11, during a time period $t_d$, as the first deflection voltage source supplies a screen voltage $V_s$ to the first set of deflection electrode segments 11, shielding electrostatically all apertures against interaction with the control electrodes of adjacent apertures.

The pulse control illustrated in FIG. 11*a* shows a case where the deflection time $t_d$ exceeds the black time $t_b$. After a time period $t_b$, some of the attracted toner particles are still transported from the toner carrier towards the information carrier and thus still influenced by the deflection forces applied to the field. However, the form and the extent of the deposited dot on the information carrier can be modified by varying the deflection time $t_d$. For instance, if the deflection time $t_d$ is shorter than the black time $t_b$, the toner particles that are least attracted are less deflected than the previously attracted toner particle, resulting in that the attracted particles are deposited throughout a larger surface on the information carrier. Accordingly, deflection time modulation can be utilized within the scope of the present invention to control the dot size of the print.

Figure 11D:
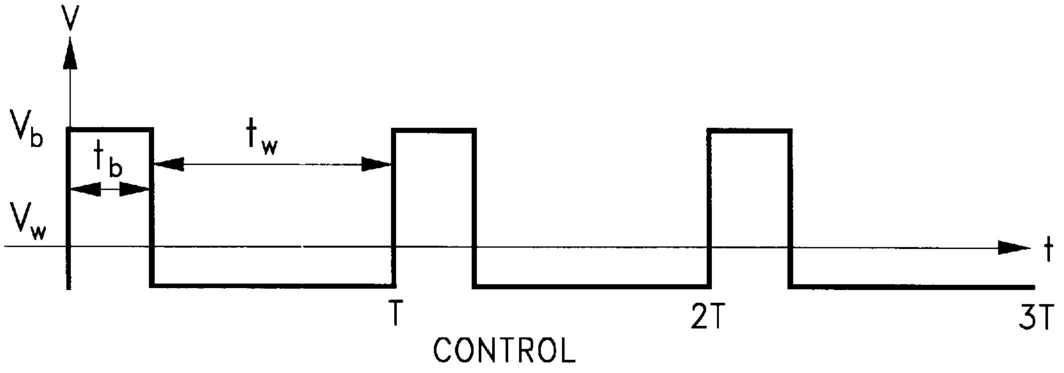
FIGS. 11*d*, 11*e*, and 11*f* illustrate a control and deflection pulse according to another embodiment of the present invention.
Figure 11E:
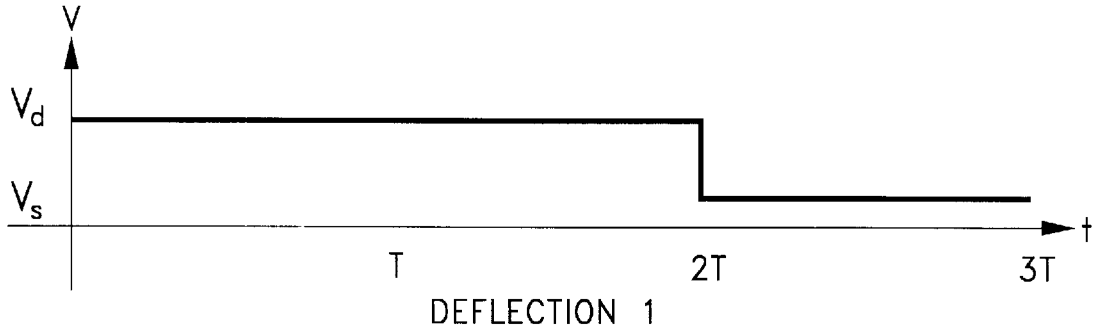
Figure 11F:
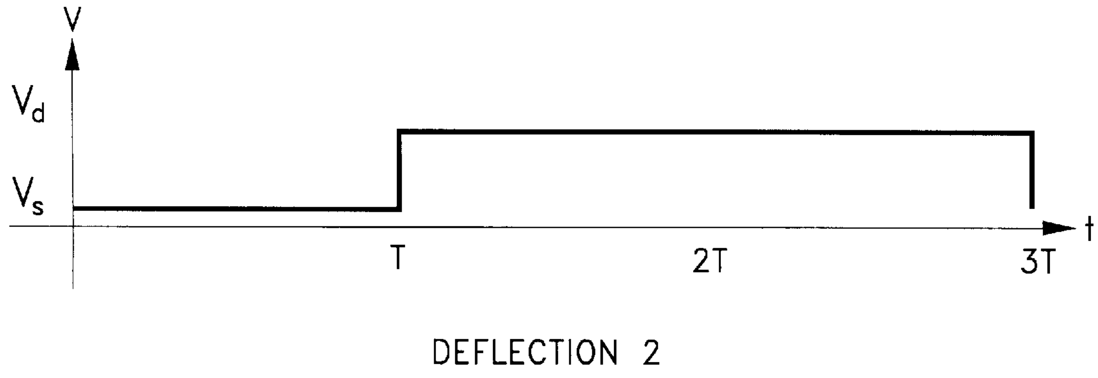

Referring to FIGS. 11*d*, 11*e*, and 11*f* an alternate control pulse can be performed to achieve the same result as that shown in FIGS. 11$a$, 11$b$, and 11$c$. The deflection segments are given a deflection voltage $V_d$, which is alternately interrupted every third sequence. Accordingly, a potential difference is created between the different segments 10, 11 during the first and the third sequences.

The example of FIGS. 11$a$ through 11$f$ are strictly illustrative and the invention is not limited by the number of print sequences nor the number of print sequences nor the number of voltage sources that are used. For instance, two or more set of electrodes can be alternately connected to one deflection voltage source by means of any switching device. The voltage sources used in that example can also supply a variable voltage to the electrodes. For instance, the voltages from the control voltage sources are not necessarily limited to either a white voltage $V_w$ preventing toner transport or a black voltage $V_b$ permitting maximal toner transport. In fact, the control voltages can be comprised in the range between $V_w$ and $V_b$ to partially open passages through the apertures. In this case, the partially opened passages allow less toner particles to be transported than that required to form a dark dot on the information carrier. Shades of toner are thus created resulting in grey scale capability and enhanced control of the image reproduction. Similarly, grey scale capability can be created by varying the black time $t_b$. The deflection voltage sources can, in a similar way, supply variable voltages to deflection electrodes, each of those voltages corresponding to a desired deflection length and, thus, to a particular dot position on the information carrier. In an alternate embodiment of the invention, each segment is given variable voltages acting either attracting or repelling on toner, so that the potential difference between two opposed segments can be modulated during each print sequence.

According to another embodiment of the invention (not shown), the different sets of deflection segments are connected to variable deflection voltage sources so that each segment is given different deflection potentials during different print sequences. For instance, each deflection segment can be connected to a deflection voltage corresponding to a deflection length of 2L, and a deflection voltage corresponding in a deflection length L. Printing is then performed in five sequences to address five transversely aligned dots through each aperture.

Figure 14:
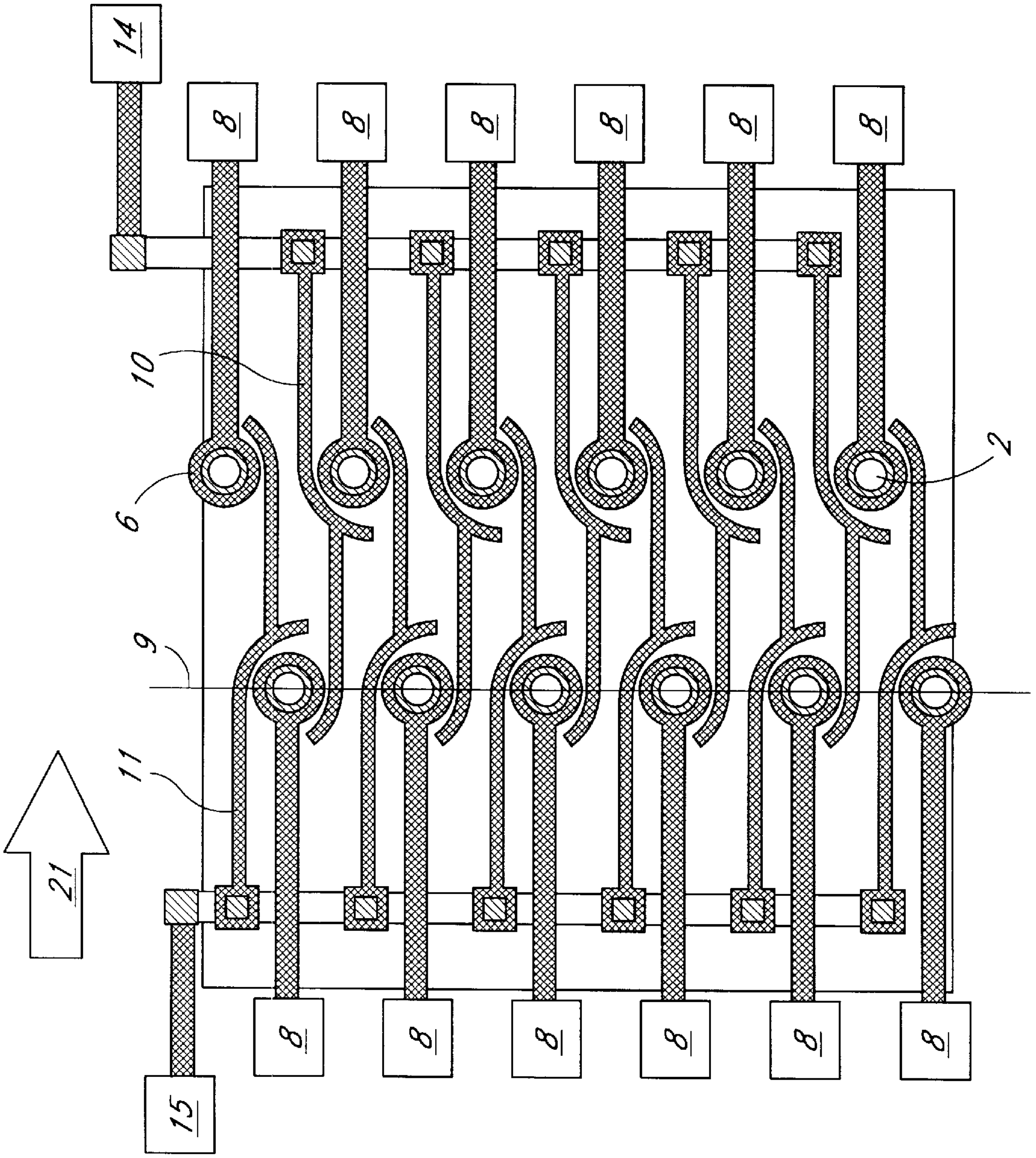
FIGS. 14 and 15 are schematic plan views of alternative control array arrangements.
Figure 15:
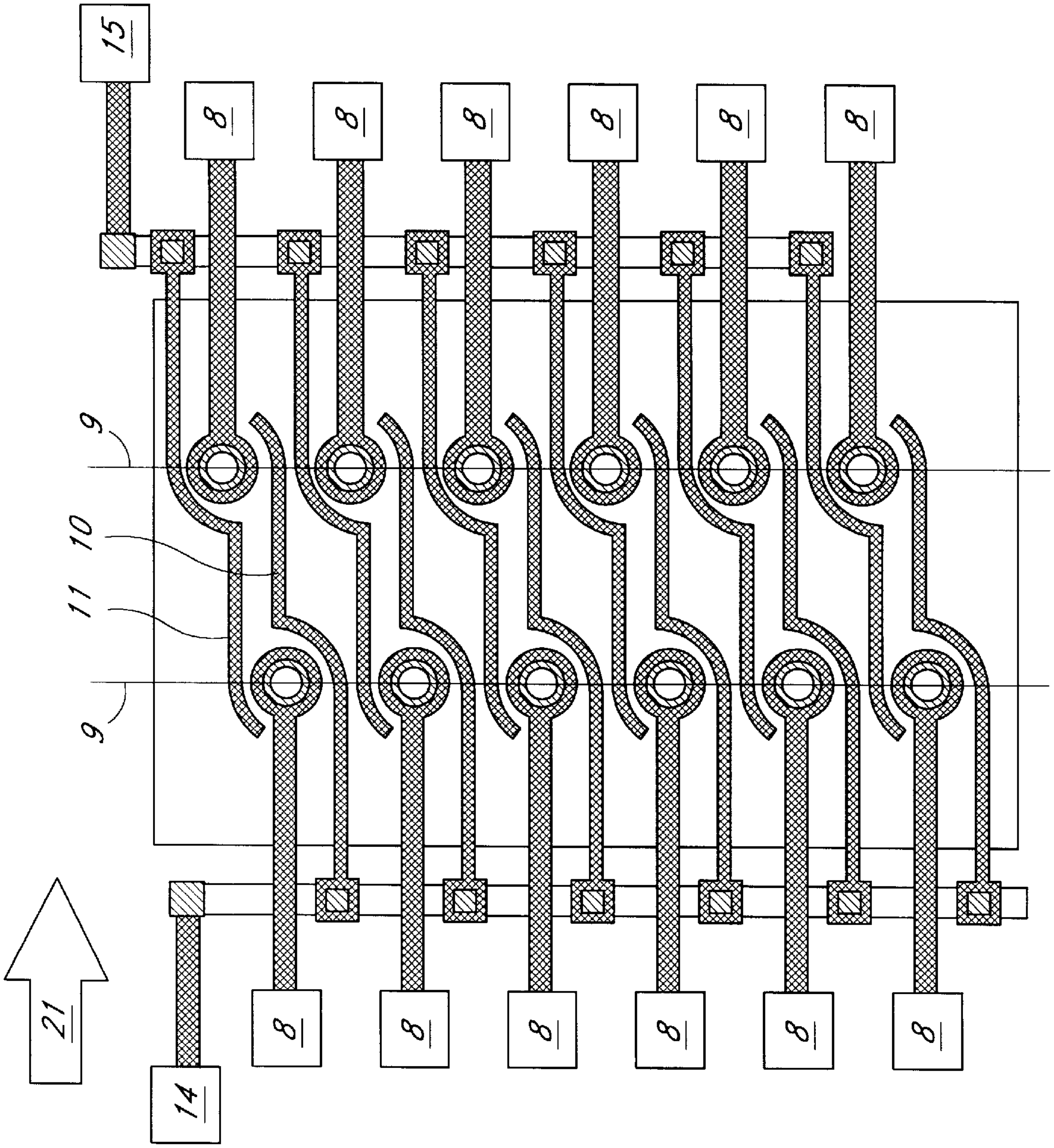

FIGS. 14 and 15 illustrate alternate design of the control array of FIG. 4, wherein the apertures 2 are aligned in at least two parallel transverse rows, and the deflection segments are connected in various configurations. Although it is preferred to utilize a control array with apertures, where toner particles pass through the apertures to deposit on the information carrier, it is not necessarily critical to the inventive aspects of the present invention. For instance, the information carrier could be fed across the top of the control array. In this embodiment, control voltage signals connected to the control electrodes of the array would create an electric field permitting or restricting toner transport from the toner carrier directly onto the information carrier without passage through an aperture. Similarly, although it is preferred to utilize one control array including the control electrodes and the deflection electrodes, it is obviously possible to achieve the same result by utilizing separate arrays, i.e., a control array associated with a deflection array, or even more than two arrays. For instance, one separate array can be utilized for each set of deflection segments to facilitate the connection of those segments. In this embodiment, is not either necessarily critical for the inventive aspects of the invention to provide the deflection arrays with apertures for allowing toner transport. In effect, the information carrier could be transferred between a control array having apertures and a deflection array influencing the toner trajectory. In such an embodiment, the control electrodes of the control array would generate electrostatic fields influencing the attractive forces from the back electrode 18 to open and close passages though the apertures of the control array, and a deflection voltage would be connected to the deflection electrodes to control the toner trajectory between the opened passages and the information carrier.

Figure 12A:
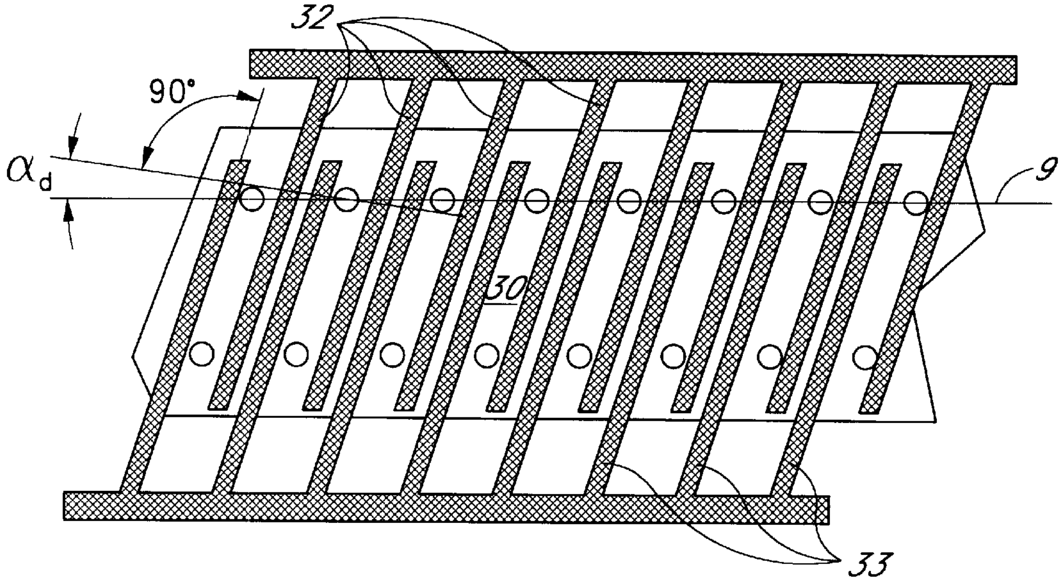
FIGS. 12*a* and 12*b* are schematic plan views of the different layers in a substrate of a control array, according to an alternative embodiment of the invention.
Figure 12B:
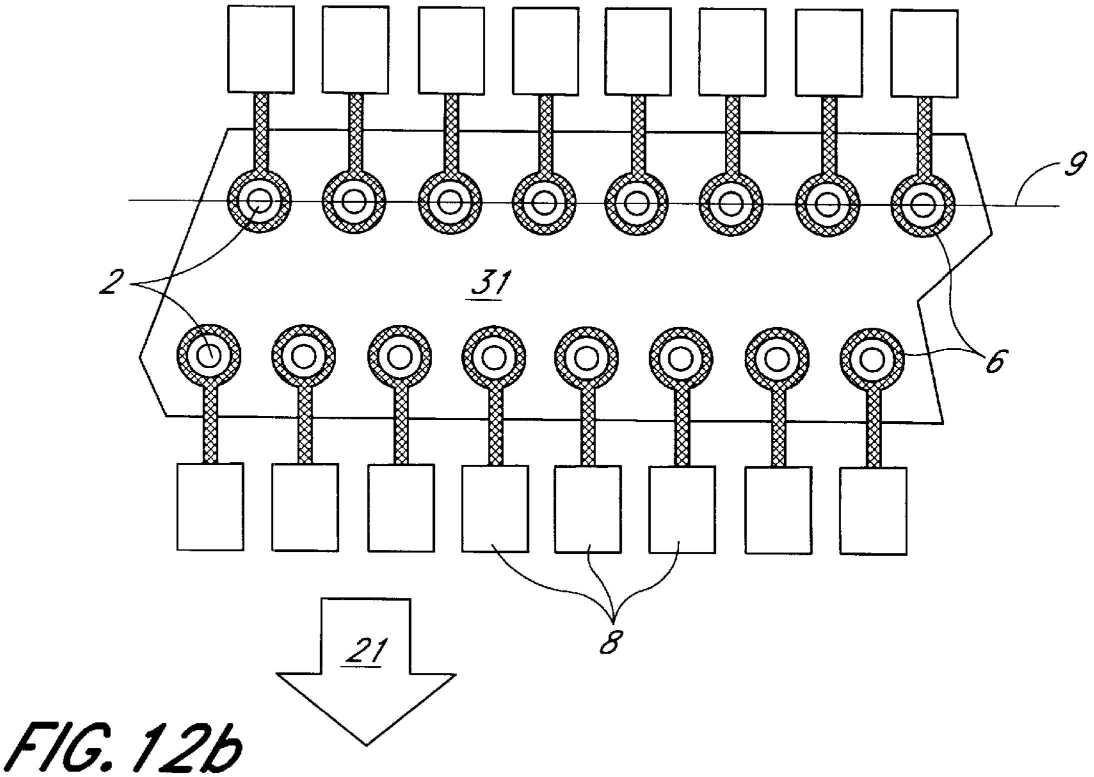

In an alternate embodiment of the invention, shown in FIGS. 12$a$ and 12$b$, the control array is formed on an insulating substrate having at least two layers 30, 31. The substrate is provided with a plurality of apertures 2 arranged through the layers 30, 31. A first layer 30, shown in FIG. 12$a$, comprises a plurality of deflection electrodes 32, 33 arranged in two sets. A second layer 31, shown in FIG. 12$b$, comprises a plurality of control electrodes 6 surrounding the apertures 2. FIG. 12$a$ is a schematic plan view of the first layer 30. The apertures 2 are arranged in parallel rows and parallel columns. The parallel rows are arranged at a deflection angle $\alpha d$ with respect to the parallel columns. This skewing ensures an improved coverage of the information carrier by providing at least one aperture at every point across a line in a direction transverse to the movement of the information carrier. The deflection electrodes 32, 33 extend substantially parallel to the columns of apertures. A first set 32 of deflection electrodes extend on one side of each column of apertures and a second set 33 of deflection electrodes extend on the opposed side of each column of apertures. Accordingly, a virtual line extending through the center of an aperture perpendicular to the deflection electrodes 32, 33 intersects the transverse axis of the aperture at an angle $\alpha d$. That angle corresponds to the direction of toner deflection. The substrate layers 30, 31 shown in FIGS. 12$a$ and 12$b$ are composed of an insulating material with electrical conductor material on its surface or through its volume. The different substrate layers 30, 31 are bonded together in accurate alignment by adhesive material. The control electrodes 6 are preferably etched on the top surface of the layer 31 facing the toner carrier and the deflection electrodes 32, 33 are preferably etched on interior layers or on the under layer 30.

Figure 13B:
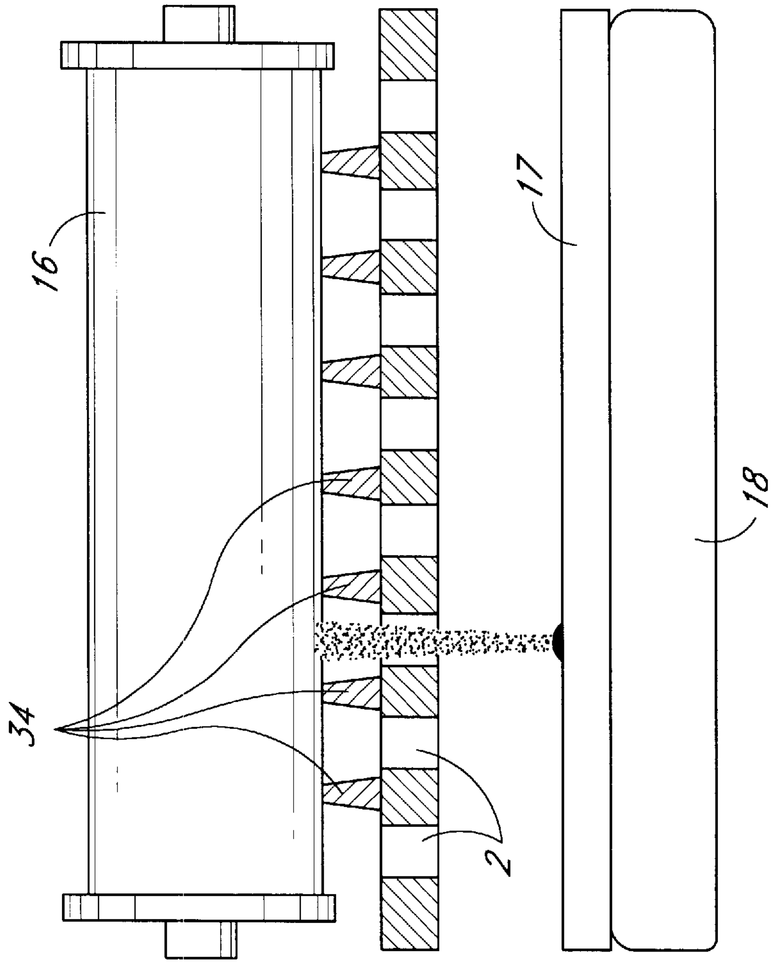
FIG. 13*b* shows a front view of a print zone including spacing means.
Figure 13A:
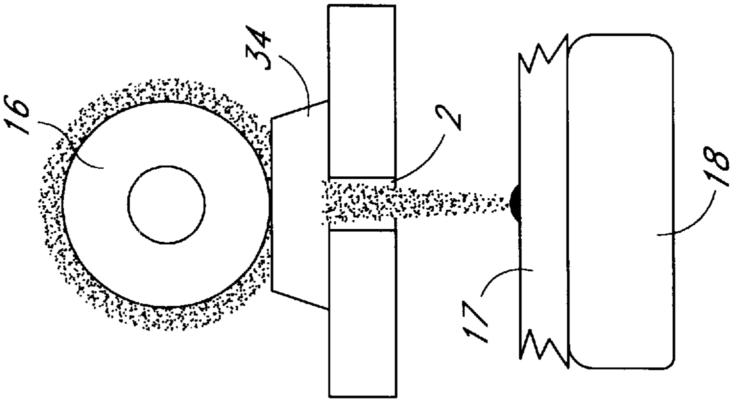
FIG. 13*a* shows a side view of a print zone including spacing means.

In another embodiment of the present invention, shown in FIGS. 13$a$ and 13$b$, spacing means 34 are arranged on the control array to maintain a constant minimal distance between the toner carrier 16 and the control array. The increased space between two adjacent apertures 2 of a transverse row 9 allows the spacing means 34 to be disposed longitudinally between the apertures, i.e., parallel to the motion of the information carrier 17.

The invention is not strictly limited to the specifics methods and devices described herein.

What is claimed is:

1. A method for improving print quality of an image recording apparatus including a control array having a plurality of apertures, a control electrode surrounding each aperture and at least one set of deflection electrodes, in which charged toner particles are deposited in an image configuration on an information carrier, the method comprising the steps of:

conveying the charged toner particles to a particle source adjacent to a back electrode;

positioning a particle receiving information carrier between the back electrode and the particle source;

creating an electric potential difference between the back electrode and the particle source to apply an attractive force on the charged toner particles;

connecting variable voltage sources to the control electrodes to produce a pattern of electrostatic fields to at least partially open or close passages in each electrostatic field by influencing the attractive force from the back electrode, thus permitting or restricting the transport of charged toner particles along a trajectory towards a first area on the information carrier; and connecting at least one deflection voltage source to at least one set of deflection electrodes to produce deflection forces modifying a symmetry of the electrostatic fields, thus controlling the trajectory of attracted charged toner particles towards a second area of the information carrier during a print period, thereby increasing a total area on the information carrier that each control electrode may transport the charged toner particles.

2. The method of claim 1, including the step of performing at least two subsequent print periods during at least one of which the symmetry of the electrostatic fields are modified to deflect the trajectory of attracted charged toner particles.

3. The method of claim 1, including the steps of performing at least two subsequent print periods during at least one of which one or more voltage sources are connected to at least a first set of deflection electrodes to produce deflection forces modifying the symmetry of the electrostatic fields, causing the charged toner particles that are attracted through the opened passages to be transported along a deflected trajectory towards the information carrier.

4. The method of claim 1, including the steps of performing at least two subsequent print periods during at least one of which the electrostatic fields generated by the control electrodes are substantially symmetric, causing the charged toner particles that are attracted through the opened passages to be transported along a substantially straight trajectory towards the information carrier.

5. A control device in an image recording apparatus in which charged toner particles are deposited in an image configuration on an information carrier, comprising:

a substrate having a plurality of control electrodes;

one or more variable voltage sources connected to each control electrode to selectively produce an electrostatic field which permits or restricts particle transport from a particle source towards the information carrier;

at least one set of deflection electrodes; and at least one deflection voltage source connectable to each set of deflection electrodes to influence a symmetry of the electrostatic fields, thereby increasing an area on the information carrier that each control electrode may transport the charged toner particles.

6. The control device of claim 5, in which the substrate comprises at least one layer of insulating material.

7. The control device of claim 5, in which the substrate comprises at least one layer of insulating material comprising control electrodes and at least one layer comprising deflection electrodes.

8. The control device of claim 5 in which the substrate comprises a plurality of apertures arranged therethrough, each aperture being at least partially surrounded by a control electrode.

9. The control device of claim 5, in which the substrate has a plurality of apertures arranged therethrough;

said control electrodes include at least one control electrode arranged symmetrically about a central axis of each aperture;

each of said electrostatic fields is symmetric about each aperture to either permit or restrict particle transport through the aperture;

said deflection electrodes include at least one deflection electrode segment positioned adjacent to each aperture; and said deflection voltage source includes a deflection voltage source connectable to at least one deflection electrode segment of each aperture to produce a deflection force modifying the symmetry of the electrostatic field about a central axis of each aperture.

10. The control device of claim 9, in which one deflection electrode segment is in electrical connection.

11. The control device of claim 9, including a second deflection electrode segment arranged in a position symmetrically opposed to said at least one deflected electrode with respect to the central axis of each aperture.

12. The control device of claim 9, in which a first electrical connection includes said segment and including a second electrical connection comprising a second deflection electrode segment symmetrically opposed to said first segment with respect to the central axis of each aperture.

13. A control device in an image recording apparatus in which charged particles are deposited in an image configuration on an information carrier, comprising:

a substrate having a plurality of control electrodes;

one or more variable voltage sources connected to each control electrode to selectively produce an electrostatic field which permits or restricts particle transport from a particle source towards the information carrier;

at least one set of deflection electrodes;

at least one deflection voltage source connectable to each set of deflection electrodes to influence a symmetry of the electrostatic fields; and wherein the substrate has a top surface facing the particle source and an opposite surface facing the information carrier, and the control electrodes are etched on said top surface of the substrate.

14. A control device in an image recording apparatus in which charged particles are deposited in an image configuration on an information carrier, comprising:

a substrate having a plurality of control electrodes;

one or more variable voltage sources connected to each control electrode to selectively produce an electrostatic field which permits or restricts particle transport from a particle source towards the information carrier;

at least one set of deflection electrodes;

at least one deflection voltage source connectable to each set of deflection electrodes to influence a symmetry of the electrostatic fields; and wherein the substrate has a top surface facing the particle source and an opposed surface facing the information carrier, and the deflection electrodes are etched on said opposite surface of the substrate.

15. A control device in an image recording apparatus in which charged particles are deposited in an image configuration on an information carrier, comprising:

a substrate having a plurality of control electrodes, said substrate having a plurality of apertures arranged therethrough, said control electrodes including at least one control electrode arranged symmetrically about a central axis of each aperture;

one or more variable voltage sources connected to each control electrode to selectively produce respective electrostatic fields which are symmetric about each aperture and which permit or restrict particle transport from a particle source towards the information carrier;

at least one set of deflection electrodes;

at least one deflection voltage source connectable to each set of deflection electrodes to influence a symmetry of the electrostatic fields about said apertures, said deflection electrodes including at least one deflection electrode segment positioned adjacent to each aperture, said deflection voltage source including a deflection voltage source connectable to at least one deflection electrode segment of each aperture to produce a deflection force modifying the symmetry of the electrostatic field about a central axis of each aperture;

wherein said at least one deflection electrode segment includes:

a first deflection electrode segment at least partially extending on one side of a transverse axis of each aperture; and a second deflection electrode segment symmetrically opposed to said first segment about the central axis of each aperture.

16. A method for improving the print quality on an information carrier having a plurality of print areas of an image recording apparatus including a control array having a plurality of apertures, a control electrode surrounding each aperture, a first deflection electrode segment arranged adjacent to each aperture and a second deflection electrode segment arranged in a position symmetrically opposed to said first deflection electrode segment with respect to a central axis of its associated aperture, wherein for each print area on said information carrier said method comprises the steps of:

a) performing a first print sequence by supplying a control voltage to each control electrode to produce a substantially symmetric electrostatic field about each aperture to permit or restrict particle transport therethrough, and creating an electric potential difference between said first deflection electrode segment and said second deflection electrode segment of each aperture to alter the symmetry of each electrostatic field in a first direction;

b) performing a second print sequence by supplying a control voltage to each control electrode to produce a substantially symmetric electrostatic field about each aperture to permit or restrict particle transport therethrough, and supplying all deflection electrode segments with a same voltage to maintain the symmetry of each electrostatic field; and c) performing a third print sequence by supplying a control voltage to each control electrode to produce a substantially symmetrical electrostatic field about each aperture to permit or restrict particle transport therethrough, and reversing the electric potential different of step (a) to alter the symmetry of each electrostatic field in a direction opposed to said first direction with respect to a central axis of each aperture.

17. A method for improving the print quality of an image recording apparatus including a control array having a plurality of apertures, a control electrode surrounding each aperture, a first deflection electrode segment arranged adjacent to each aperture and a second deflection electrode segment arranged in a position symmetrically opposed to said first deflection electrode segment with respect to a central axis of its associated aperture, said method comprises the steps of:

a) supplying a control voltage to each control electrode to produce a substantially symmetric electrostatic field about each aperture to permit or restrict particle transport therethrough, and creating an electric potential difference between said first deflection electrode segment and said second deflection electrode segment of each aperture to alter the symmetry of each electrostatic field in a first direction;

b) supplying a control voltage to each control electrode to produce a substantially symmetric electrostatic field about each aperture to permit or restrict particle transport therethrough, and supplying all deflection electrode segments with a same voltage to maintain the symmetry of each electrostatic field; and c) supplying a control voltage to each control electrode to produce a substantially symmetrical electrostatic field about each aperture to permit or restrict particle transport therethrough and reversing the electric potential different of step (a) to alter the symmetry of each electrostatic field in a direction opposed to said first direction with respect to a central axis of each aperture, wherein the electric potential differences of steps (a) and (c) are maintained during a time period $t_d$, so that $0<t_d<T$, where T is a total time of one step.

18. A method for improving the print quality of an image recording apparatus including a control array having a plurality of apertures a control electrode surrounding each aperture, a first deflection electrode segment arranged adjacent to each aperture and a second deflection electrode segment arranged in a position symmetrically opposed to said first deflection electrode segment with respect to a central axis of its associated aperture said method comprises the steps of:

a) supplying a control voltage to each control electrode to produce a substantially symmetric electrostatic field about each aperture to permit or restrict particle transport therethrough, and creating an electric potential difference between said first deflection electrode segment and said second deflection electrode segment of each aperture to alter the symmetry of each electrostatic field in a first direction;

b) supplying a control voltage to each control electrode to produce a substantially symmetric electrostatic field about each aperture to permit or restrict particle transport therethrough, and supplying all deflection electrode segments with a same voltage to maintain the symmetry of each electrostatic field; and c) supplying a control voltage to each control electrode to produce a substantially symmetrical electrostatic field about each aperture to permit or restrict particle transport therethrough, and reversing the electric potential different of step (a) to alter the symmetry of each electrostatic field in a direction opposed to said first direction with respect to a central axis of each aperture, wherein the electric potential differences of steps (a) and (c) are maintained during a time period $t_d$, so that $0<t_d<t_b<T$, where T is a total time of one step and where $t_b$ is a time period during which particle transport is permitted through an aperture.

19. A method for improving the print quality of an image recording apparatus including a control array having a plurality of apertures, a control electrode surrounding each aperture, a first deflection electrode segment arranged adjacent to each aperture and a second deflection electrode segment arranged in a position symmetrically opposed to said first deflection electrode segment with respect to a central axis of its associated aperture, said method comprises the steps of:

a) supplying a control voltage to each control electrode to produce a substantially symmetric electrostatic field about each aperture to permit or restrict particle transport therethrough, and creating an electric potential difference between said first deflection electrode segment and said second deflection electrode segment of each aperture to alter the symmetry of each electrostatic field in a first direction;

b) supplying a control voltage to each control electrode to produce a substantially symmetric electrostatic field about each aperture to permit or restrict particle transport therethrough, and supplying all deflection electrode segments with a same voltage to maintain the symmetry of each electrostatic field; and c) supplying a control voltage to each control electrode to produce a substantially symmetrical electrostatic field about each aperture to permit or restrict particle transport therethrough, and reversing the electric potential different of step (a) to alter the symmetry of each electrostatic field in a direction opposed to said first direction with respect to a central axis of each aperture, wherein the electric potential difference of steps (a) and (c) are maintained during a time period $t_d$, so that $0<t_b<t_d<T$, where T is a total time of one step and where $t_b$ is a time period during which particle transport is permitted through an aperture.

20. A method for improving the print quality of an image recording apparatus including a control array having a plurality of apertures, a control electrode surrounding each aperture, a first deflection electrode segment arranged adjacent to each aperture and a second deflection electrode segment arranged in a position symmetrically opposed to said first deflection electrode segment with respect to a central axis of its associated aperture, said method comprises the steps of:

a) supplying a control voltage to each control electrode to produce a substantially symmetric electrostatic field about each aperture to permit or restrict particle transport therethrough, and creating an electric potential difference between said first deflection electrode segment and said second deflection electrode segment of each aperture to alter the symmetry of each electrostatic field in a first direction;

b) supplying a control voltage to each control electrode to produce a substantially symmetric electrostatic field about each aperture to permit or restrict particle transport therethrough, and supplying all deflection electrode segments with a same voltage to maintain the symmetry of each electrostatic field; and c) supplying a control voltage to each control electrode to produce a substantially symmetrical electrostatic field about each aperture to permit or restrict particle transport therethrough, and reversing the electric potential different of step (a) to alter the symmetry of each electrostatic field in a direction opposed to said first direction with respect to a central axis of each aperture, wherein the electric potential difference of step (a) decreases during step (a) and the electric potential difference of step (c) increases during step (c).

21. A method for improving the print quality of an image recording apparatus including a control array having a plurality of apertures, a control electrode surrounding each aperture, a first deflection electrode segment arranged adjacent to each aperture and a second deflection electrode segment arranged in a position symmetrically opposed to said first deflection electrode segment with respect to a central axis of its associated aperture, said method comprises the steps of:

a) supplying a control voltage to each control electrode to produce a substantially symmetric electrostatic field about each aperture to permit or restrict particle transport therethrough, and creating an electric potential difference between said first deflection electrode segment and said second deflection electrode segment of each aperture to alter the symmetry of each electrostatic field in a first direction;

b) supplying a control voltage to each control electrode to produce a substantially symmetric electrostatic field about each aperture to permit or restrict particle transport therethrough, and supplying all deflection electrode segments with a same voltage to maintain the symmetry of each electrostatic field; and c) supplying a control voltage to each control electrode to produce a substantially symmetrical electrostatic field about each aperture to permit or restrict particle transport therethrough, and reversing the electric potential different of step (a) to alter the symmetry of each electrostatic field in a direction opposed to said first direction with respect to a central axis of each aperture, wherein the electric potential difference of step (a) alters the symmetry of the electrostatic fields to deflect the trajectory of attracted particles obliquely against motion of an information carrier.

22. A control device in an image recording apparatus in which charged particles are deposited in an image configuration on an information carrier, including a substrate positioned between a particle source and a moving information carrier, said substrate comprising:

a plurality of apertures arranged in at least one transverse row having a transverse axis extending perpendicular to a motion of the information carrier;

at least one control electrode arranged symmetrically about a central axis of each aperture;

at least one deflection electrode segment arranged adjacent to each aperture; and at least one spacer extending parallel to the motion of the information carrier between two adjacent apertures to maintain a constant distance between the substrate and the particle source.

23. The control device of claim 22, wherein the spacer contacts the particle source.

* * * * *